United States Patent
Dlugasch et al.

(10) Patent No.: US 11,331,596 B2
(45) Date of Patent: *May 17, 2022

(54) MULTI-DIMENSIONAL CHROMATOGRAPHIC SYSTEM FOR ANALYZING MULTIPLE SAMPLE COMPONENTS

(71) Applicant: Waters Technologies Corporation, Milford, MA (US)

(72) Inventors: Amanda B. Dlugasch, Ashland, MA (US); Thomas E. Wheat, Hopedale, MA (US); Daniel Root, Westfield, MA (US); Jean-Michel Plankeele, Le Blanc-Mesnil (FR); Isabelle Francois, Sint-Lievens-Houtem (BE); Edward R. Aig, Fair Lawn, NJ (US)

(73) Assignee: Waters Technologies Corporation, Milford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/023,043

(22) Filed: Sep. 16, 2020

(65) Prior Publication Data

US 2020/0406165 A1  Dec. 31, 2020

Related U.S. Application Data

(63) Continuation of application No. 15/415,441, filed on Jan. 25, 2017, now Pat. No. 10,799,813.
(Continued)

(51) Int. Cl.
*B01D 15/18* (2006.01)
*G01N 30/46* (2006.01)
*G01N 30/02* (2006.01)

(52) U.S. Cl.
CPC ....... *B01D 15/1878* (2013.01); *G01N 30/463* (2013.01); *G01N 2030/027* (2013.01)

(58) Field of Classification Search
CPC ............ B01D 15/1864; B01D 15/1871; B01D 15/1878; G01N 30/46; G01N 30/461; G01N 30/463; G01N 30/465
See application file for complete search history.

(56) References Cited

U.S. PATENT DOCUMENTS

| | | | | |
|---|---|---|---|---|
| 5,117,109 A | * | 5/1992 | Asakawa | G01N 30/728 210/198.2 |
| 6,790,361 B2 | * | 9/2004 | Wheat | B01D 15/166 210/143 |

(Continued)

*Primary Examiner* — Justin N Olamit

(57) ABSTRACT

A chromatography system includes a first chromatography column for receiving and separating a flow stream, a plurality of traps configured to trap a plurality of distinct flow segments exiting the first chromatography column during separation of the flow stream, and a second chromatography column operatively associated with the plurality of traps for receiving and separating the distinct flow segments. The system can include at-column dilution at trapping and separating stages thereof. A chromatography method for operating the chromatographic system includes measuring a plurality of time segments corresponding to a plurality of peaks of a fluid sample flowing through the first chromatographic column, and sequentially fluidly coupling the plurality of distinct flow segments with the corresponding plurality of traps during time segments corresponding to the plurality of peaks.

20 Claims, 17 Drawing Sheets

Related U.S. Application Data

(60) Provisional application No. 62/305,915, filed on Mar. 9, 2016, provisional application No. 62/286,603, filed on Jan. 25, 2016.

(56) References Cited

U.S. PATENT DOCUMENTS

| | | | | |
|---|---|---|---|---|
| 6,955,760 B2 * | 10/2005 | Iwata | ............... | G01N 30/462 |
| | | | | 210/101 |
| 8,642,351 B2 * | 2/2014 | Liu | ............... | G01N 30/34 |
| | | | | 436/161 |
| 2007/0023639 A1 * | 2/2007 | Yamashita | ............... | G01N 30/463 |
| | | | | 250/288 |

* cited by examiner

PDA: 254 nm

%B: Organic

| | | | | |
|---|---|---|---|---|
| Phenacetin | | | | |
| Replicate 1 | 14.676 | 14.679 | 0.004 | 0.02 |
| Replicate 2 | 14.686 | | | |
| Replicate 3 | 14.679 | | | |
| Replicate 4 | 14.677 | | | |
| Replicate 5 | 14.678 | | | |
| Replicate 6 | 14.679 | | | |
| Sulfadimethoxine | RT | Average | Std. Dev. | %RSD |
| Replicate 1 | 14.728 | 14.731 | 0.003 | 0.02 |
| Replicate 2 | 14.737 | | | |
| Replicate 3 | 14.731 | | | |
| Replicate 4 | 14.730 | | | |
| Replicate 5 | 14.730 | | | |
| Replicate 6 | 14.732 | | | |
| 361 | | | | |
| Replicate 1 | 14.893 | 14.897 | 0.004 | 0.02 |
| Replicate 2 | 14.903 | | | |
| Replicate 3 | 14.898 | | | |
| Replicate 4 | 14.897 | | | |
| Replicate 5 | 14.895 | | | |
| Replicate 6 | 14.894 | | | |
| 3-Benzoylpyridine | | | | |
| Replicate 1 | 14.986 | 14.993 | 0.008 | 0.05 |
| Replicate 2 | 15.005 | | | |
| Replicate 3 | 14.999 | | | |
| Replicate 4 | 14.993 | | | |
| Replicate 5 | 14.992 | | | |
| Replicate 6 | 14.983 | | | |

Figure 17

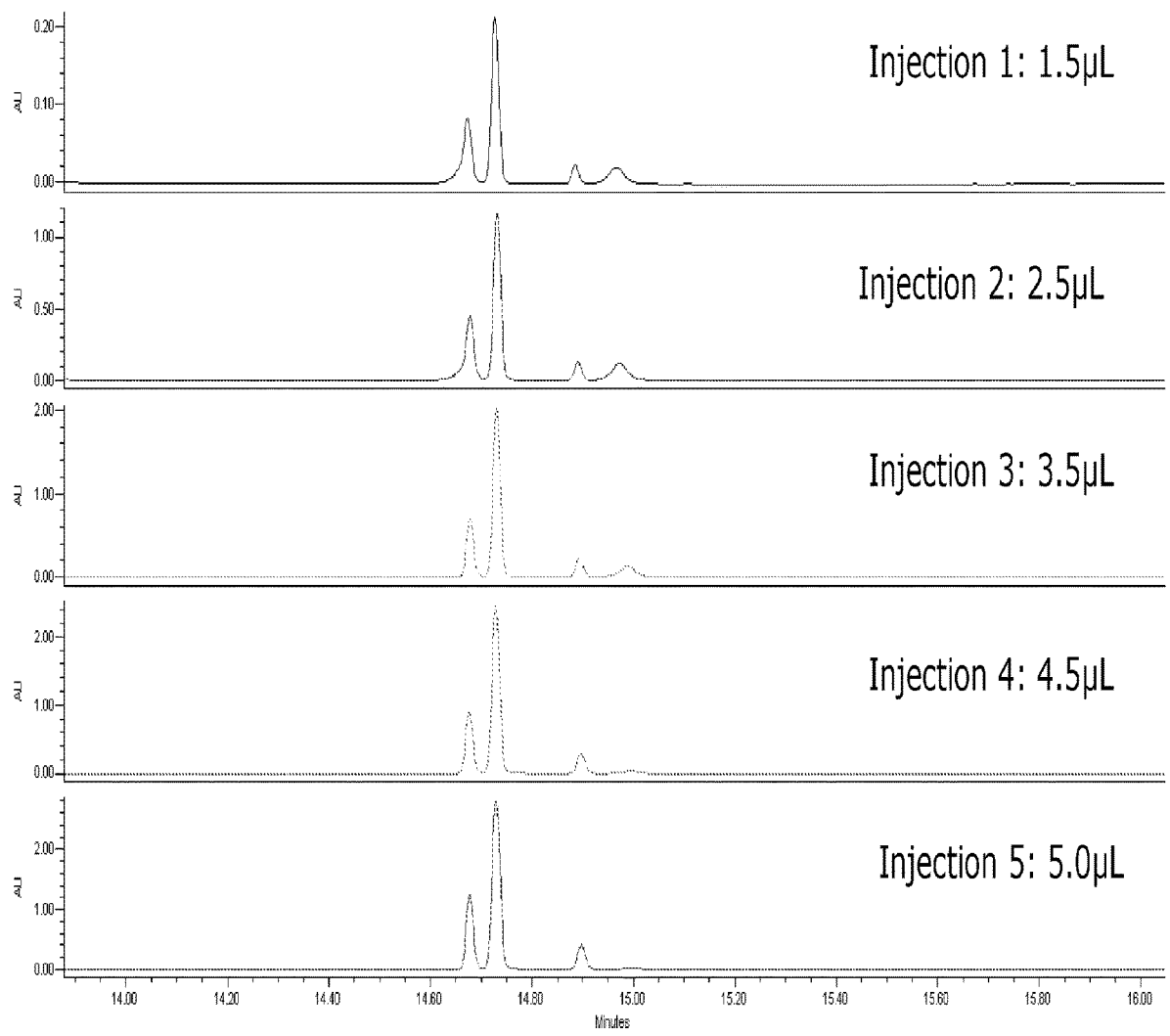

MULTI-DIMENSIONAL CHROMATOGRAPHIC SYSTEM FOR ANALYZING MULTIPLE SAMPLE COMPONENTS

CROSS-REFERENCE TO RELATED APPLICATIONS

This application is continuation of U.S. patent application Ser. No. 15/415,441, filed Jan. 25, 2017, which claims priority to and the benefit of U.S. Provisional Patent Application No. 62/305,915, filed Mar. 9, 2016, and U.S. Provisional Patent Application No. 62/286,603, filed Jan. 25, 2016, the contents of which are incorporated by reference herein in their entirety.

BACKGROUND OF THE INVENTION

1. Field of the Invention

The present disclosure relates generally to chromatography systems and methods for performing multi-dimensional chromatography. More particularly, the present disclosure relates to a system and method for enhancing multi-dimensional chromatography during a single loading of a fluid sample.

2. Description of Related Art

In many fields of science, purified compounds are required for testing and analysis protocols. Purification of a compound involves separating out a desired component or components from a mixture that contains additional components or impurities. Chromatography is a method of fractionating a mixture to separate components thereof. In liquid chromatography, a sample containing a number of components to be separated is injected into a fluid stream, and directed through a chromatographic column. The column is designed to separate the mixture through differential retention on the column into component species. The different species then emerge from the column as distinct bands, separated in time.

A typical high performance liquid chromatography system (HPLC system) includes a pump for delivering fluids (the "mobile phase") at a controlled flow rate and composition, an injector to introduce a sample solution into the flowing mobile phase, a tubular column encasement containing a packing material or sorbent (the "stationary phase"), and a detector to register the presence and amount of the sample components in the mobile phase. When the mobile phase is passed through the stationary phase, each component of the sample will emerge from the column at a different time because different components in the sample will have different affinities for the packing material. The presence of a particular component in the mobile phase exiting the column can be detected by measuring changes in physical or chemical properties of the eluent. By plotting the detector's signal over time, response "peaks" corresponding to the presence of each of the components of the sample can be observed and recorded.

A typical chromatography system includes a single column, or dimension, containing the stationary phase. One of the limits of traditional chromatographic techniques is the limited number of components that can be resolved in a single analysis. This limitation can be addressed using multi-dimensional chromatography. For example, in two-dimensional chromatography, a particular group of components is transferred to a second separation column. The group of components is typically one that is not well separated on the first dimension, and may co-elute in a single peak or band. The group of components, however, can be better separated on the second separation column. The second separation column typically has an orthogonal mode of separation relative to the first separation column. However, all chromatographic techniques reach a fundamental limit in the number of components that can be resolved in a single analysis, and a given sample often has more than one component or group of components that requires this orthogonal separation.

Common practice has been to collect fractions from the separation for analysis on a second system or a second series of runs with a different method, or using the typical two-dimensional system. The sample is analyzed repeatedly, as many times as the number of peaks required to be cut. A different peak or time segment on each run is selected for transfer to the orthogonal separation. Short cycle times on the second dimension can also be used so that the two analyses remain coordinated in parallel. This approach sacrifices resolution to save time. Additionally, analytical methods that incorporate separation technologies are required to resolve all sample components to provide unequivocal identification with the possibility of reliable quantitation, and all chromatographic techniques reach a fundamental limit in the number of components that can be resolved in a single analysis.

Thus, improvements in efficiency, functionality, and accuracy of multi-dimensional liquid chromatography are needed in the art.

BRIEF SUMMARY OF THE INVENTION

The inventive disclosure is directed to new and useful chromatography systems and methods for multidimensional chromatography. In various embodiments of the inventive disclosure, the chromatography system includes a first chromatography column for receiving and separating a flow stream, a plurality of traps configured to trap a plurality of distinct flow segments exiting the first chromatography column during separation of the flow stream, and a second chromatography column operatively associated with the plurality of traps for receiving and separating the distinct flow segments.

In certain embodiments, the chromatography system includes a plurality of valves configured to selectively fluidly couple to one another, to the first and second chromatography columns, and to the plurality of traps. The plurality of valves may be configurable to a first position defining a first flow path which fluidly couples the first chromatography column to a detector, and fluidly isolates the first chromatography column from the plurality of traps, and a second position defining a second flow path which fluidly couples the first chromatography column with a first of the plurality of traps for trapping a first of the plurality of distinct flow segments, and fluidly isolates the first chromatography column from all but the first of the plurality of traps. The plurality of valves may also be configurable to a third position defining a third flow path which fluidly couples the first chromatography column with a second of the plurality of traps for trapping a second of the plurality of distinct flow segments, and fluidly isolates the first chromatography column from all but the second of the plurality of traps.

In certain embodiments, the plurality of valves are configurable to a fourth position defining a fourth flow path which fluidly couples the first trap and the second chromatography column to direct the first distinct flow segment from the first trap to the second chromatography column, and a fifth position defining a fifth flow path which fluidly couples the second trap with the second chromatography column to direct the second distinct flow segment to the second chromatography column.

The system may additionally include a plurality of pumps for pumping a plurality of flow streams through the chromatography system. The plurality of pumps include a first pump in fluid communication with an inlet of the first chromatography column, and a second pump operatively associated with the second chromatography column and the plurality of traps. In certain embodiments, the plurality of valves are configurable to a rinse position defining a sixth flow path which fluidly couples the second pump with the second chromatography column for rinsing the second chromatography column, and fluidly isolates the second pump from the plurality of traps. The plurality of valves may also be configurable to a first release position which fluidly couples the second pump, the first trap, and the second chromatography column for releasing the first distinct flow segment from the first trap to the second chromatography column, and fluidly isolates the second pump from all but the first of the plurality of traps. The plurality of valves can also be configured to a second release position which fluidly couples the second pump, the second trap, and the second chromatography column for releasing the second distinct flow segment from the second trap to the second chromatography column, and fluidly isolates the second pump from all but the second of the plurality of traps.

In accordance with certain embodiments, the plurality of pumps can include a third pump, and in the second position of the plurality of valves, the third pump can be placed in fluid communication with the second flow path, and configured to dilute the first distinct flow segment as the first distinct flow segment flows from the first chromatography column to the first trap. In the third position of the plurality of valves, the third pump can be placed in fluid communication with the third flow path, and configured to dilute the second distinct flow segment as the second distinct flow segment flows from the first chromatography column to the second trap. The plurality of valves can also be configured to selectively fluidly couple the third pump to the released first distinct flow segment between the first trap and the second chromatography column, and to selectively fluidly couple the third pump to the released second distinct flow segment between the second trap and the second chromatography column, such that the released first and second flow segments are weakened prior to reaching the second chromatography column.

In accordance with additional embodiments, the plurality of traps can include at least one trap cartridge having absorbent material. In other embodiments, the at least one trap cartridge can includes six cartridges. In yet other embodiments, the plurality of traps can include at least one empty tube.

The subject inventive disclosure is also directed to a chromatography system which includes a first chromatography column, a second chromatography column, and a pair of valves having a plurality of ports. The pair of valves are configured to trap a plurality of distinct flow segments which exit the first chromatography column during separation of a flow stream therein between corresponding pairs of the plurality of ports, and to selectively fluidly couple each of the plurality of trapped distinct flow segments with the second chromatography column. In certain embodiments, each of the pair of multiport valves is a nine port, eight position valve.

The subject inventive disclosure is also directed to a chromatography method which includes directing a fluid sample through a first chromatographic column configured to receive and separate the fluid sample, guiding a plurality of distinct flow segments exiting the first chromatographic column during separation of the fluid sample in the first chromatographic column to a corresponding plurality of traps, trapping the plurality of distinct flow segments in the plurality of traps, releasing the trapped plurality of distinct flow segments from the plurality of traps, and directing the released plurality of distinct flow segments through a second chromatographic column configured to receive and separate the released plurality of distinct flow segments. In certain embodiments, the plurality of traps are operatively disposed between a pair of multiport valves, and the distinct flow segments of the separated fluid sample are fluidly coupled to the corresponding plurality of traps during different time segments.

The plurality of distinct flow segments of the separated fluid sample can be trapped in the corresponding plurality of traps during a single loading of the fluid sample through the first chromatographic column. Additionally, the plurality of distinct flow segments of the separated fluid sample can be released from the plurality of traps and directed through the second chromatographic column in sequence. In accordance with certain embodiments, each of the distinct flow segments can be diluted prior to trapping the plurality of distinct flow segments in the plurality of traps, and between the plurality of traps and the second chromatographic column.

The subject inventive disclosure is also directed to a chromatography method which includes measuring a plurality of time segments corresponding to a plurality of peaks of a fluid sample flowing through a first chromatographic column configured to separate the fluid sample, and sequentially fluidly coupling a plurality of distinct flow segments exiting the first chromatographic column during separation of the fluid sample in the first chromatographic column with a corresponding plurality of traps. The sequential fluid coupling of the distinct flow segments with the plurality of traps occurs during respective time segments corresponding to the measured plurality of time segments associated with the plurality of peaks. The distinct flow segments can be trapped in the plurality of traps, sequentially released, and fluidly coupled to a second chromatographic column. In certain embodiments, the distinct flow segments are trapped in the plurality of traps during a single loading of the fluid sample through the first chromatographic column.

BRIEF DESCRIPTION OF THE DRAWINGS

So that those skilled in the art to which the systems and methods for multidimensional chromatography of the inventive disclosure appertains will readily understand how to make and use the subject invention without undue experimentation, preferred embodiments thereof will be described in detail herein below with reference to certain figures, wherein:

FIG. 17 is a table showing the reproducibility of the retention times for four analytes using the methods of the claimed invention; and FIG. 18 is an exemplary chromatogram showing the reproducibility of retention times and the linear increase in peak size in the second dimension in relation to sample injection size.

DETAILED DESCRIPTION OF THE INVENTION

Figure 1:
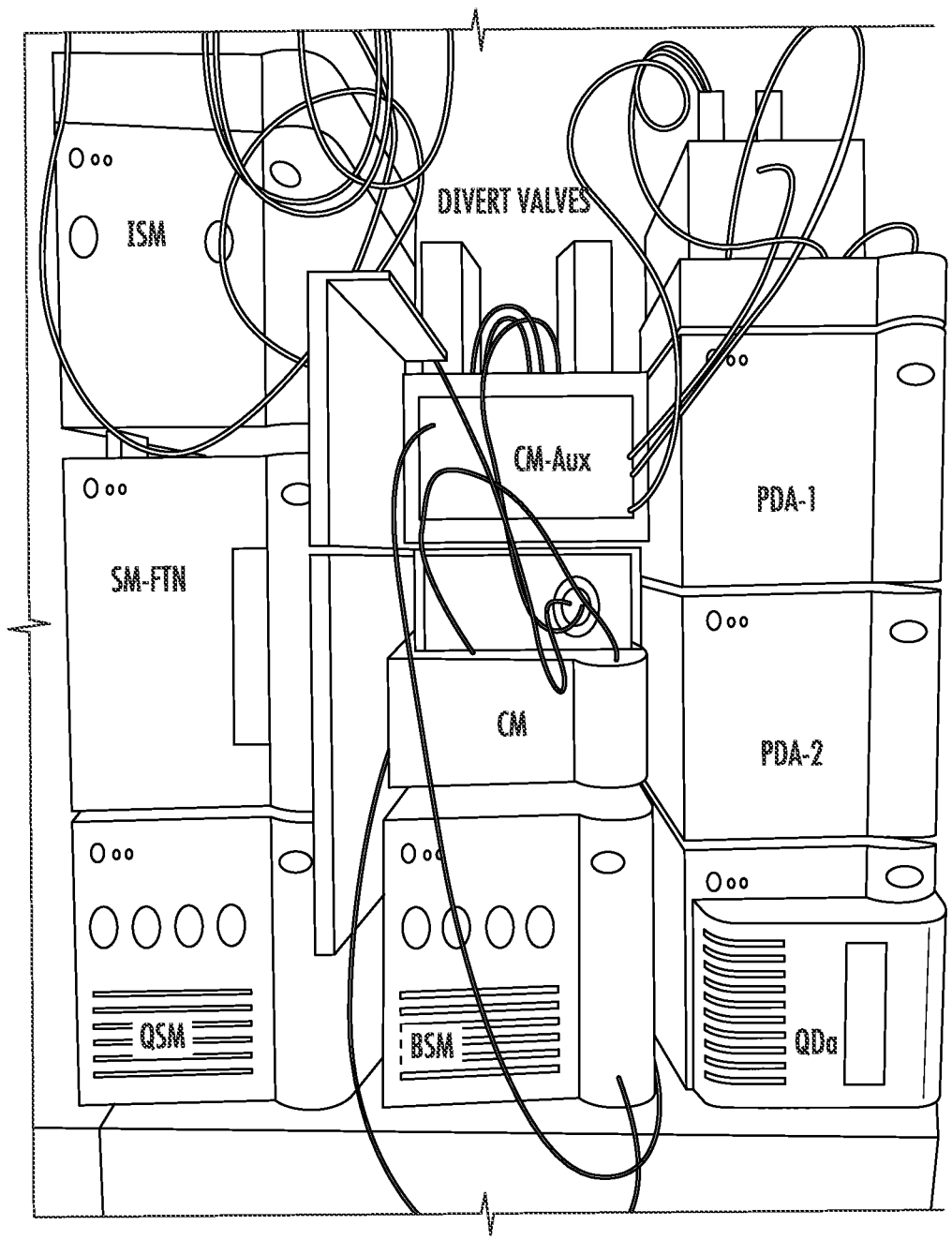
FIG. 1 is an exemplary stacked configuration of a multidimensional chromatography system in accordance with the inventive disclosure.

Referring now to the drawings, new and useful chromatography systems and methods for multidimensional chromatography are shown. Referring now to FIG. 1, an exemplary embodiment of the chromatography system of the present disclosure is shown. The system configuration is a three stack system. The first stack, shown on the left, includes the following modules from the bottom to top: QSM (First dimension pump), SM-FTN, and ISM (Dilusion Pump). The second stack of the system, shown to the right of the first stack, includes the following modules from bottom to top: BSM (Second dimension pump), CM, CM Aux, and two ACQUITY Divert Valves with 6-port, two position valves. The Column Manager also contains two 9-port, 8-position valves. The third stack of the system, shown to the right of the second stack, includes from bottom to top: a QDa (Second dimension detector), a PDA-2 for the second dimension, and a PDA-1 for the first dimension. The valves in the Column Manager are used to direct flow through one of 6 trapping cartridges (or holding loops/bypass tubes), or to waste as further discussed below with respect to FIGS. 2-4 and 7-12.

Figure 2:
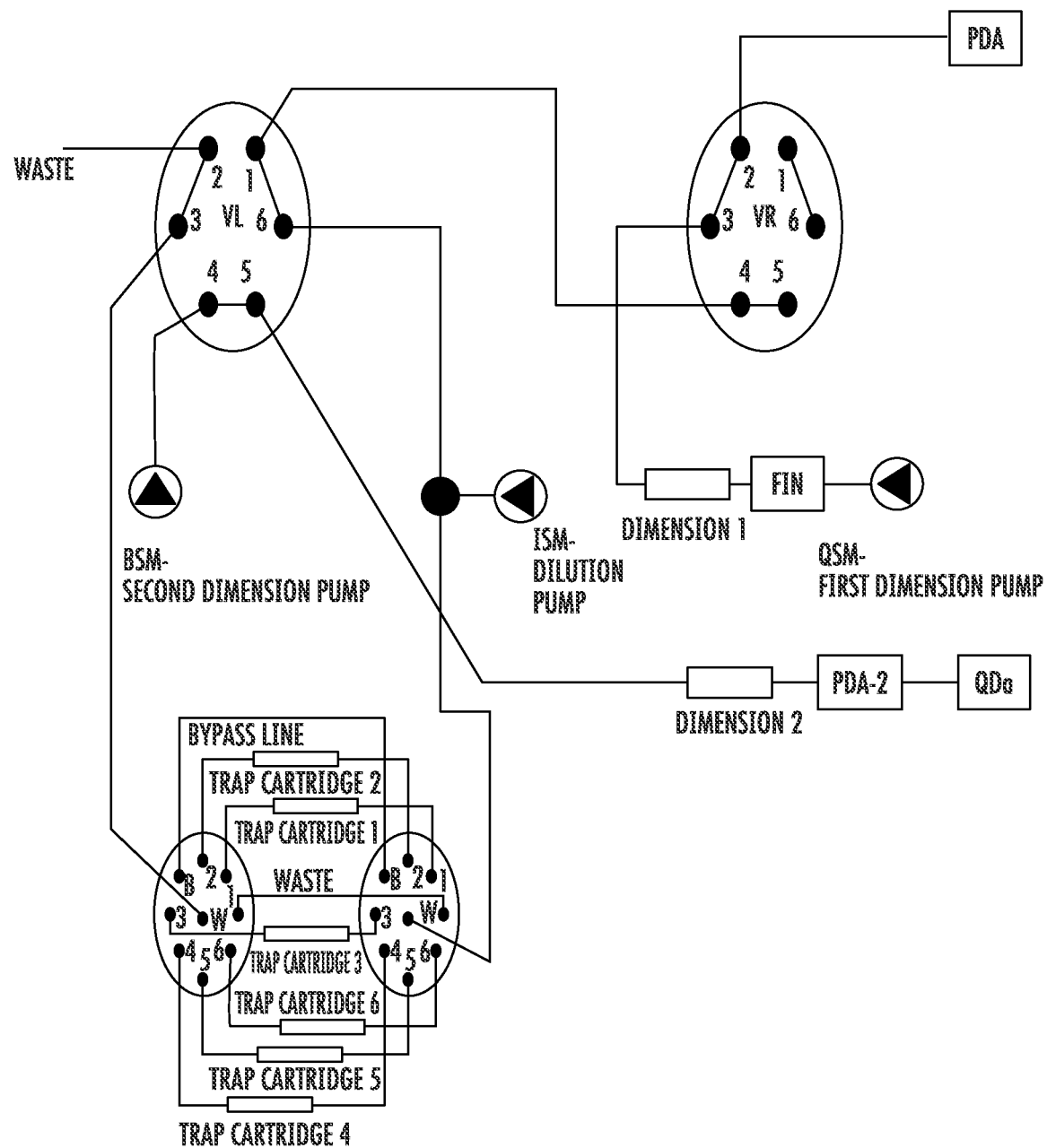
FIG. 2 is a schematic layout and exemplary flow diagram of a multi-dimensional chromatography system in accordance with the inventive disclosure.
Figure 3:
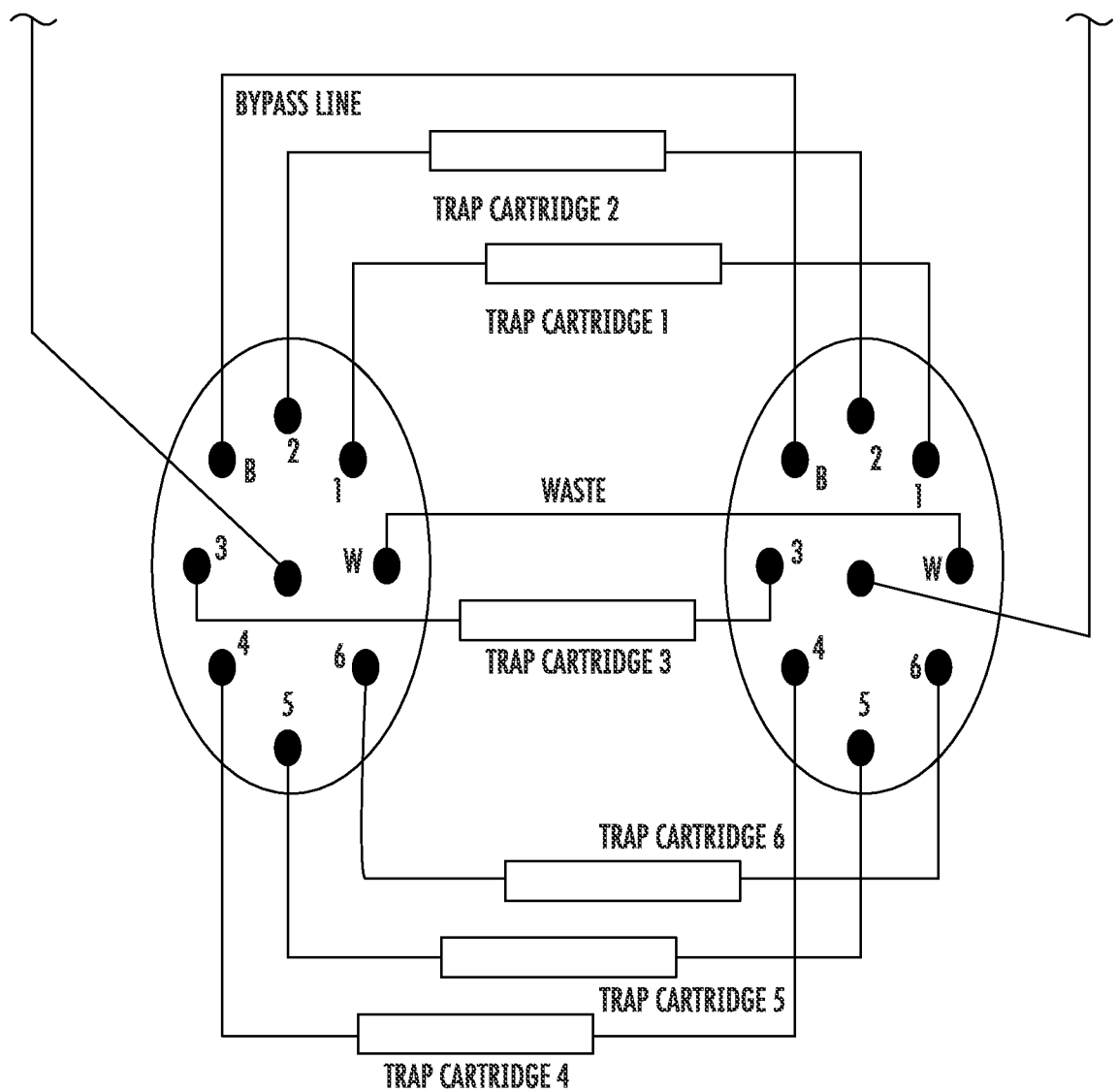
FIG. 3 is an enlarged view of the pair of multi-port valves and trap cartridges of FIG. 2.

Referring now to FIGS. 2-3, a schematic layout and exemplary flow diagram of the multi-dimensional chromatography system of FIG. 1 are shown, as well as an enlarged view of the pair of multi-port valves and trap cartridges in accordance with the inventive disclosure. The system allows for transfer of multiple components of a sample to a second dimension, and for complete analysis of each of the multiple components in a single run, all in a fully automated system. The system can also include At-column dilution for adjusting the sample stream for optimal trapping and improving second dimension analysis. By automating analysis of the components of a sample using two different chromatographic mechanisms, the inventive methodology of the present disclosure greatly increases selectivity and peak capacity, thus achieving complete chromatographic resolution.

Figure 4:
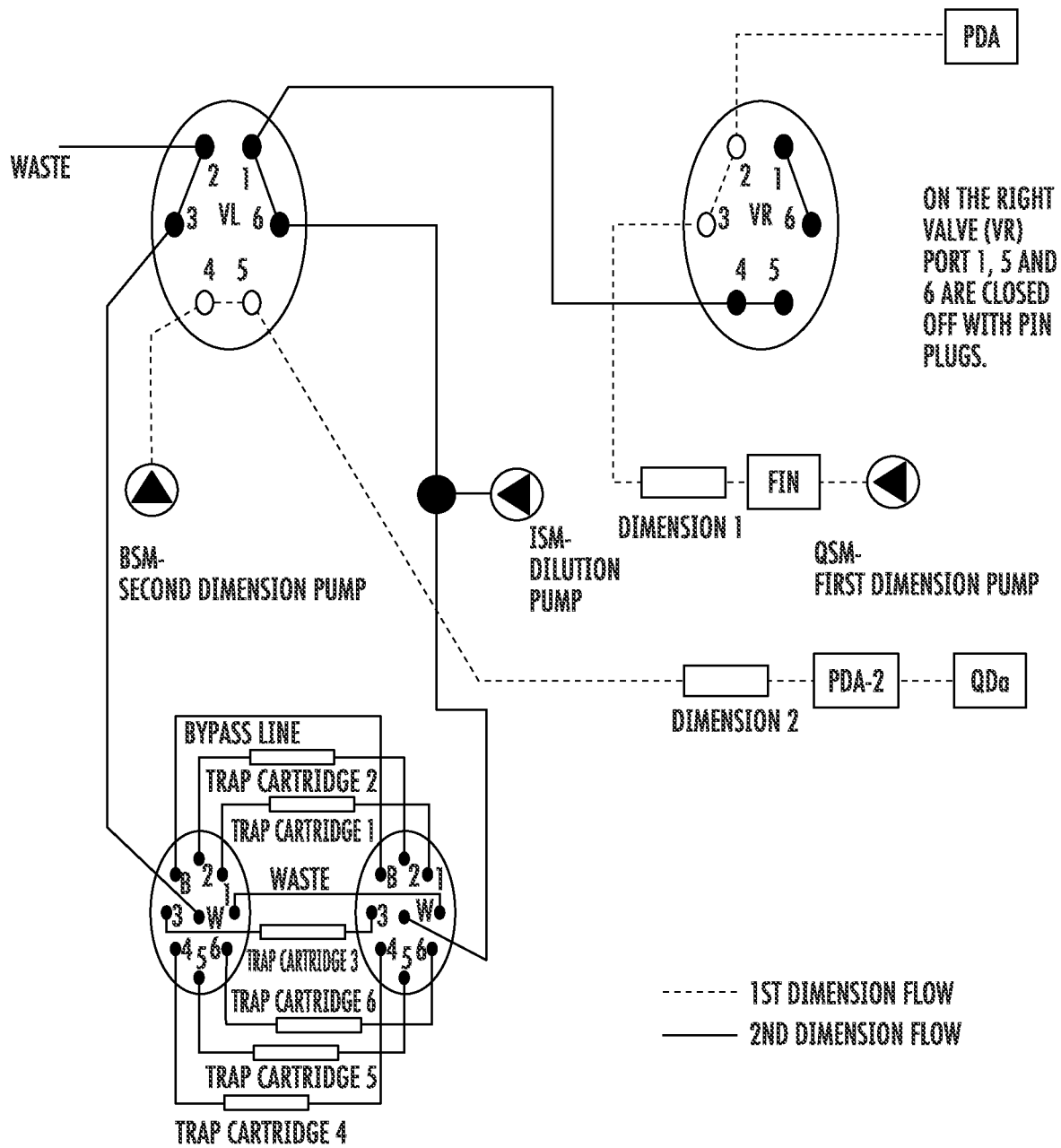
FIG. 4 is an exemplary flow diagram of the multi-dimensional system of FIG. 2 illustrating the valves configured to a first position.

Referring now to FIG. 4, the multi-dimensional system of FIG. 2 is shown with valves therein configured to a first position. More particularly, the first position of the valves provides a flow path from the first dimension pump QSM, through the first chromatography column (Dimension 1) and the right valve VR, to the first detector PDA while the second dimension pump BSM is fluidly coupled to the left valve VL, the second chromatography column (Dimension 2), and the second PDA-2 detector and the QDa detector. In this position, the flow path of the first dimension pump is fluidly isolated from the right valve VR and trap cartridges 1-6, and allows the first detector PDA to analyze the sample for peaks as it exits the first chromatography column in flow segments having different composition based on the separation in the first chromatography column. If desired, the second dimension pump BSM can simultaneously be run to rinse the second chromatography column.

Figure 5:
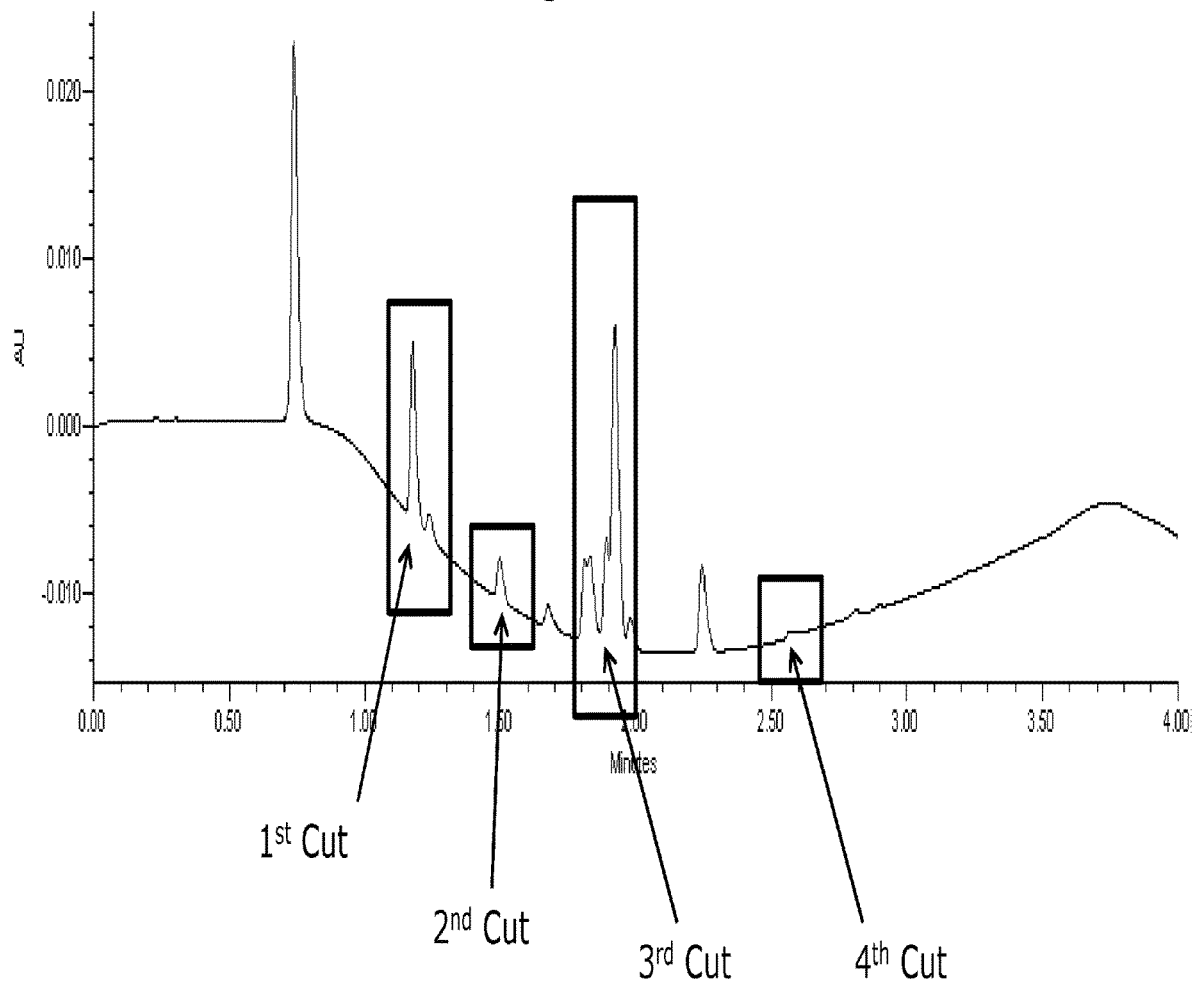
FIG. 5 is an exemplary chromatogram of a sample solution analyzed after passing through the first chromatography column, and highlights four time segments (cuts) corresponding to four exemplary peaks warranting analysis.

Referring now to FIG. 5, an exemplary chromatogram of a sample solution is recorded and analyzed while the sample passes through and is separated by the first chromatography column. Four exemplary time segments (cuts) corresponding to four exemplary peaks are deemed to warrant analysis, and are highlighted by the rectangular boxes shown in FIG. 5.

Figure 6:
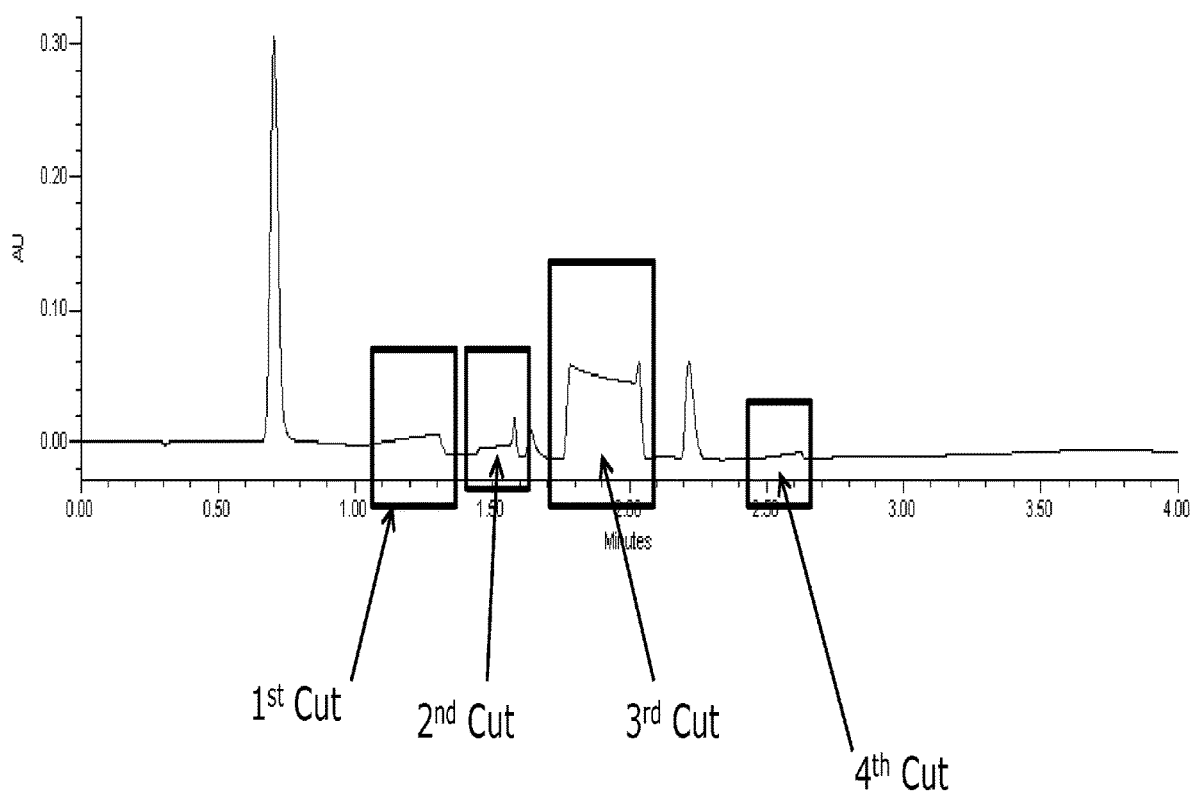
FIG. 6 is an exemplary chromatogram of the output of detector PDA-1 when the valves of the system are activated to divert flow to one or more trap cartridges.

Referring now to FIG. 6, an exemplary chromatogram shows the output of detector PDA-1 when the valves of the system have been activated to divert the flow to one or more trap cartridges as discussed below. During those time segments, the effluent flow from the first chromatography column is routed to the trap valve(s), and no flow goes to PDA-1. Thus, the peaks shown in FIG. 5 are not detected in FIG. 6.

Figure 7:
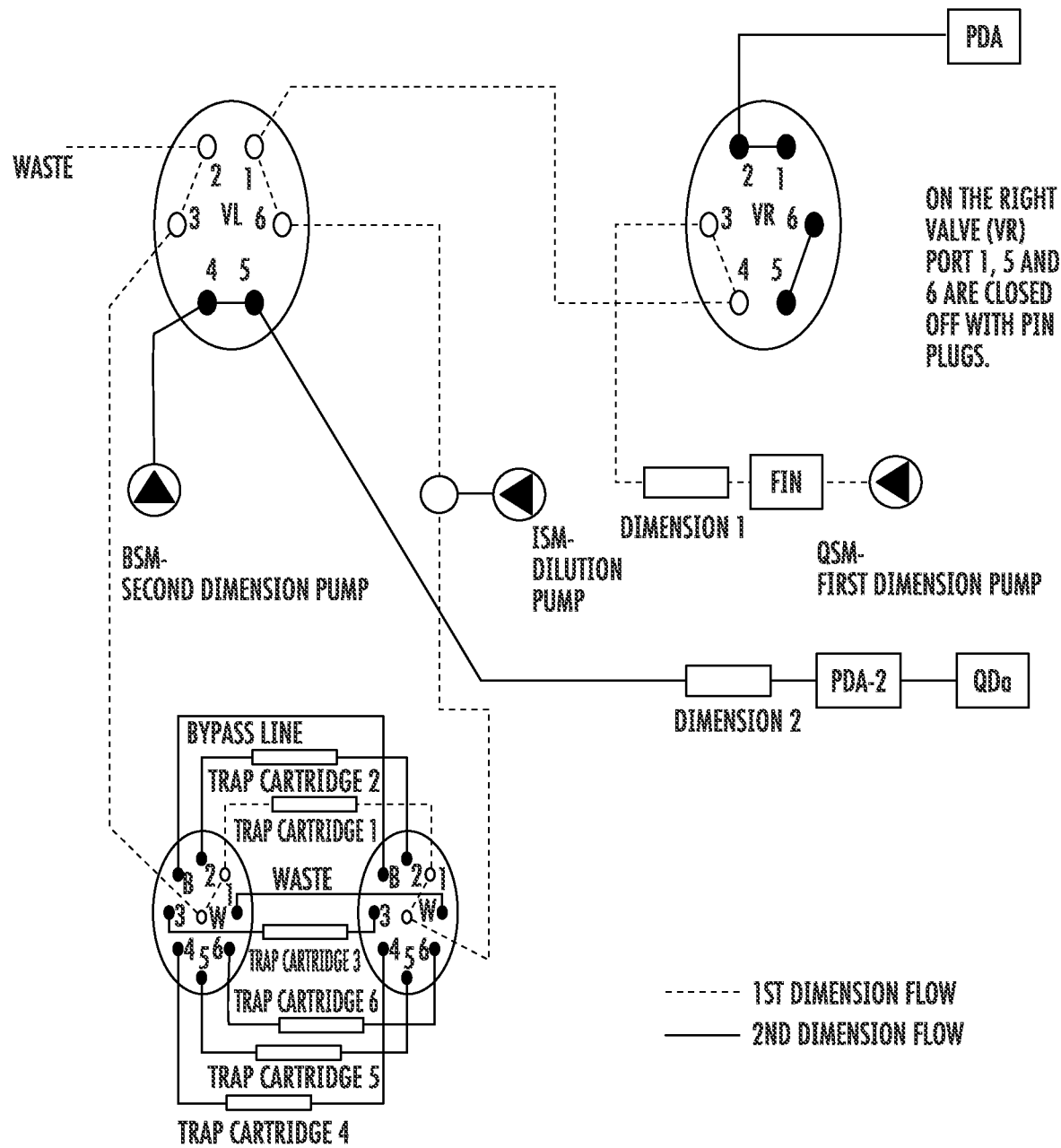
FIG. 7 is an exemplary flow diagram of the multi-dimensional system of FIG. 2 illustrating the valves configured to a second position.

Referring now to FIG. 7, the multi-dimensional system of FIG. 2 is shown with valves therein configured to a second position. More particularly, the second position of the valves provides a flow path from the first dimension pump QSM, through the first chromatography column, the right valve VR, the left valve VL, one of the pair of multi-port valves (bottom right at port 1), a first trap cartridge 1 disposed between ports 1-1 of the pair of multi-port valves, the other of the pair of multi-port valves (bottom left at port 1), back to the left valve VL at port 3, and to waste while the second dimension pump BSM is fluidly coupled to the left valve VL, the second chromatography column, and the second PDA-2 detector and the QDa detector. It will be appreciated that given the sample data of FIG. 5, the system is configured to this second position at an elapsed time T1 corresponding to the beginning time of the first cut in FIG. 5 following loading of the sample into the first chromatography column. For example, at time T1, a distinct flow segment corresponding to the first cut begins to exit the first chromatography column, and the valves are set to provide the flow path of FIG. 7 so that this first cut flow segment is routed to the first trap cartridge where a portion thereof is trapped. Any remaining flow is routed to waste through the left valve VL. It will be appreciated that during this process, the valves can be configured as desired to trap distinct fluid segments exiting the first chromatography column in any of the traps desired, and to fluidly couple and fluidly isolate various system components as needed.

Figure 8:
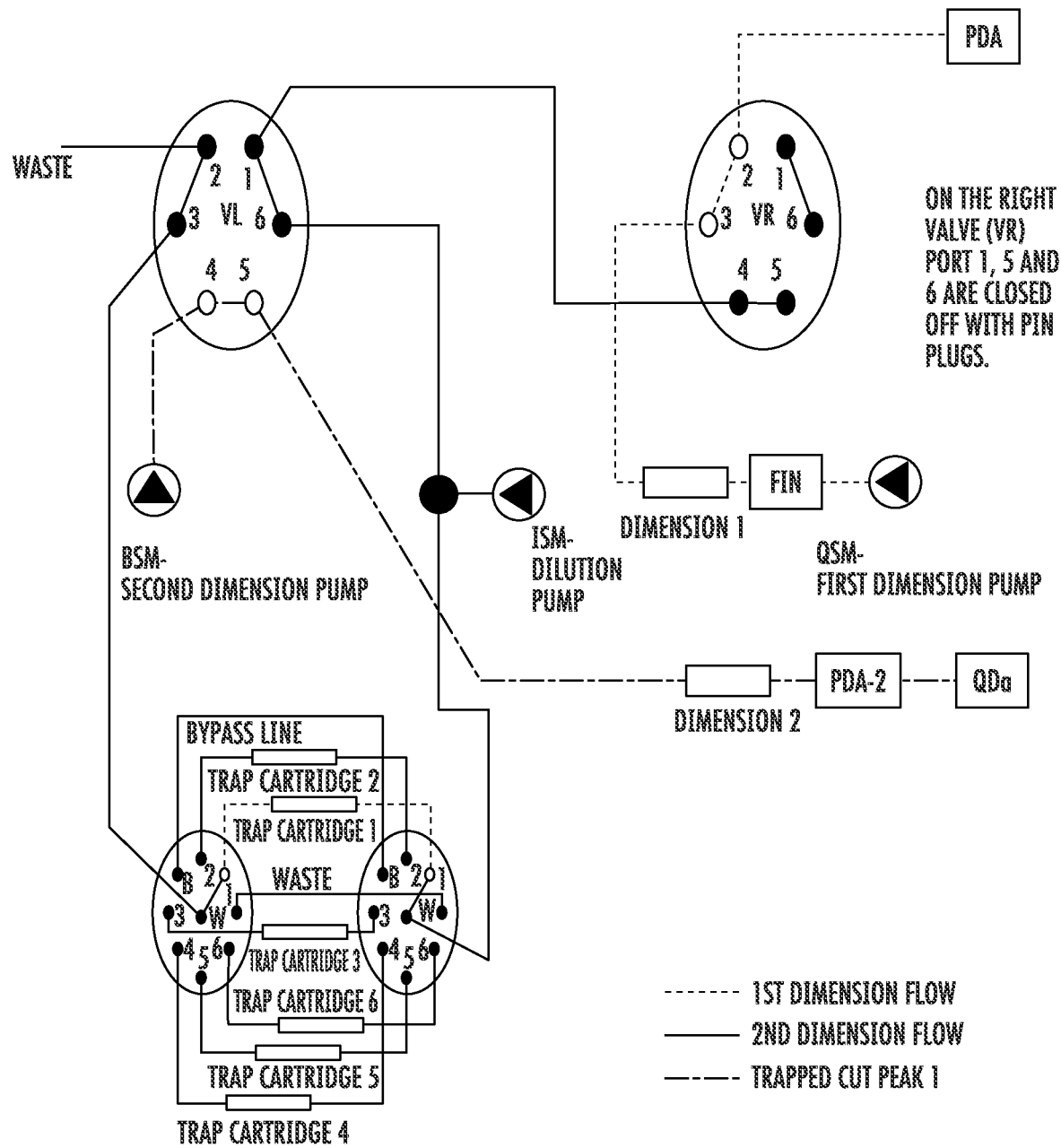
FIG. 8 is an exemplary flow diagram of the multi-dimensional system of FIG. 2 illustrating the valves configured to a rinse position with a trapped flow segment.

Referring now to FIG. 8, the multi-dimensional system of FIG. 2 is shown with the valves configured to a rinse position in which the distinct first cut flow segment corresponding to the first peak of the sample solution is trapped in the first trap cartridge (e.g., between port 1 of each of the pair of multiport valves), the first dimension pump QSM is in fluid communication with the right valve VR and the first detector PDA, and the second dimension pump BSM is fluidly coupled with the left valve VL, the second chromatography column, and the second PDA-2 detector and the QDa detector. In this rinse position, the PDA is observed until a time T2 corresponding to the beginning of the second cut in FIG. 5, and the second chromatography column is again optionally rinsed by the second dimension pump BSM.

Figure 9:
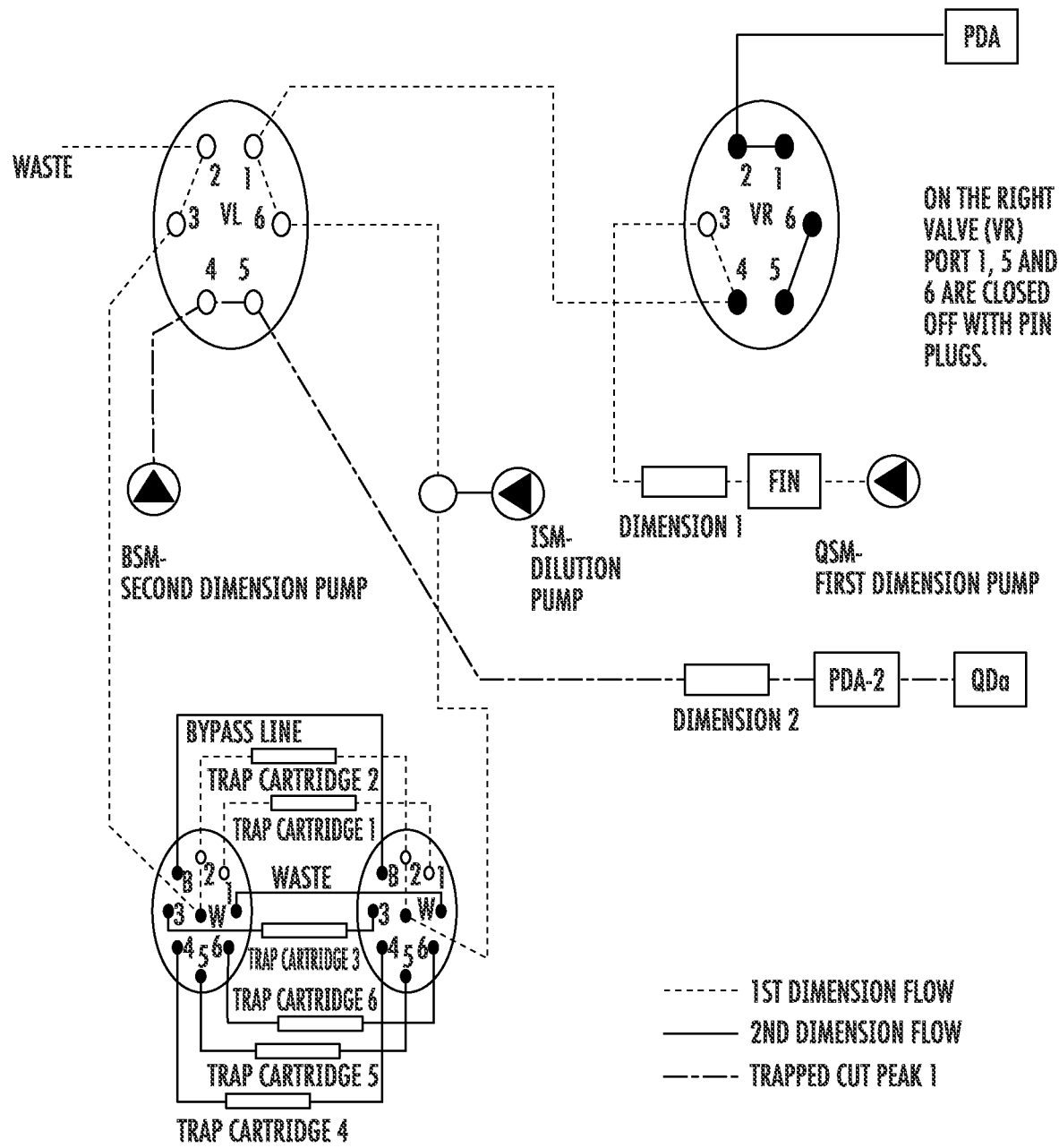
FIG. 9 is an exemplary flow diagram of the multi-dimensional system of FIG. 2 illustrating the valves configured to a third position.

Referring now to FIG. 9, at time T2, a distinct flow segment corresponding to the second cut begins to exit the first chromatography column, and the valves are set to provide a flow path which routes this second cut flow segment to the second trap cartridge where a portion thereof is trapped. More particularly, this position of the valves shown in FIG. 9 provides a flow path from the first dimension pump QSM, through the first chromatography column, the right valve VR, the left valve VL, one of the pair of multi-port valves (bottom right at port 2), a second trap cartridge 2 disposed between ports 2-2 of the pair of multi-port valves, the other of the pair of multi-port valves (bottom left at port 2), back to the left valve VL at port 3, and to waste while the second dimension pump BSM is fluidly coupled to the left valve VL, the second chromatography column, and the second PDA-2 detector and the QDa detector. In this manner this second cut flow segment is routed to the second trap cartridge where a portion thereof is trapped, and any remaining flow is routed to waste through the left valve VL.

Figure 10:
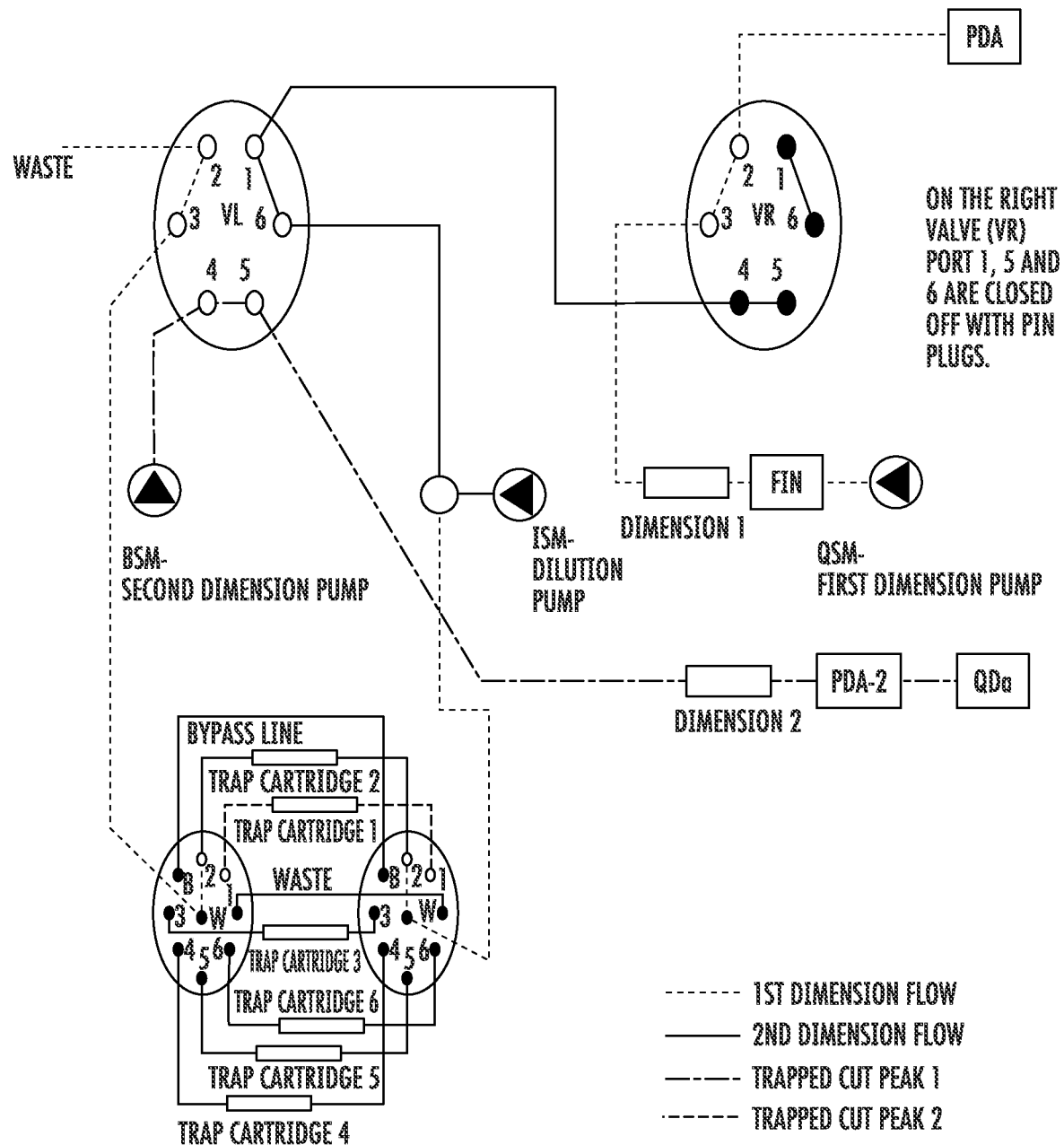
FIG. 10 is an exemplary flow diagram of the multi-dimensional system of FIG. 2 illustrating the valves configured to an additional rinse position

Referring now to FIG. 10, the multi-dimensional system of FIG. 2 is shown with the valves configured to an additional rinse position in which the distinct first and second cut flow segments corresponding to the first and second peaks of the sample solution are both trapped in the first and second trap cartridges, respectively, the first dimension pump QSM is in fluid communication with the right valve VR and the first detector PDA, and the second dimension pump BSM is fluidly coupled with the left valve VL, the second chromatography column, and the second PDA-2 detector and the QDa detector. In this rinse position, the PDA is observed until a time T3 corresponding to the beginning of the third cut in FIG. 5.

The above described process is repeated, and the valves are switched to appropriate configurations (either manually or via automation), until all of the distinct flow segments exiting the first chromatography column corresponding to all of the cuts marked in FIG. 5 are captured in the respective traps operatively disposed between the pair of multiport valves. During the above described process, dilution pump ISM may optionally be utilized with a mixing 'T' in fluid communication with the flow paths to the respective traps in order to dilute (e.g., change the concentration, pH, solvent identity, and/or concentration of strong solvent) and thus better trap the distinct flow segments exiting the first chromatography column and routed to the traps in a way that ensures optimal retention on the next chromatographic element, by, for example, changing pH or other parameter. The mixing 'T' configuration utilized can be in accordance with embodiments disclosed in, for example U.S. Pat. Nos. 6,790,361, 7,875,175, and 7,909,994, the disclosures of which are hereby incorporated by reference in their entireties. This At-column Dilution stage for adjusts the isolated peak composition before the second mode of chromatography. While water may be utilized to reduce the organic solvent content, various techniques for pH adjustment may also be utilized. Various other dilution configurations and techniques are described in U.S. Application No. 62/286, 603, the disclosure of which is hereby incorporated by reference in its entirety. It will also be appreciated by those skilled in the art that the configurations of the valves described fluidly isolate as well as fluidly couple the trap cartridges, pumps, and chromatography columns as shown and as desired, and that additional configurations are contemplated and within the scope of the inventive disclosure.

Figure 11:
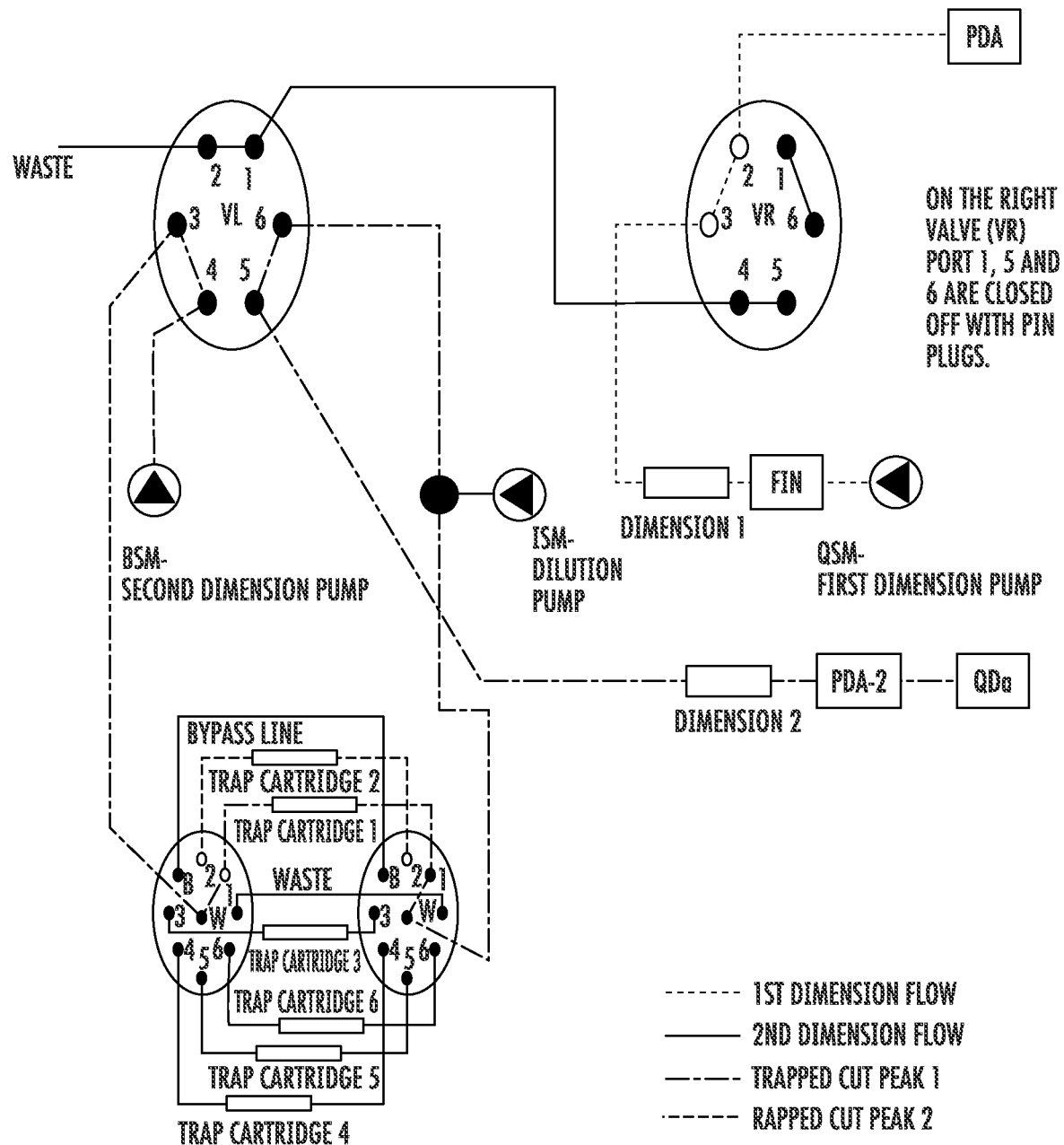
FIG. 11 is an exemplary flow diagram of the multi-dimensional system of FIG. 2 illustrating the valves configured to a fourth position.

Referring now to FIG. 11, once all of the distinct flow segments corresponding to the peaks marked in FIG. 5 are trapped in the respective traps during a single loading of the sample through the first chromatography column, the valves configured to a release position which provides a flow path from the second dimension pump BSM, through the left valve VL, one of the pair of multi-port valves (bottom left multiport valve at port 1), the first trap cartridge, the other of the pair of multi-port valves (bottom right multiport valve at port 1), the left valve VL again, the second chromatography column, and the second dimension detectors while the first dimension pump is fluidly coupled to the first chromatography column, the right valve VR, and the first detector. It will be appreciated that the second dimension pump BSM is thus used here to release the first cut distinct flow segment trapped in the first trap cartridge (ports 1-1 of the multiport valves are opened, allowing release of the trapped flow segment through the center port of the bottom right multi-port valve), and the valves are used to guide the released flow segment through the left valve VL and to the second chromatography column for a second separation (which may be orthogonal to the first). Dilution pump ISM and mixing 'T' may similarly be used here to weaken the released flow segment prior to it reaching the second chromatography column to improve separation functionality in the second chromatography column. The segments passing through the second chromatography column are observed with the second PDA-2 detector and the QDa detector. Once this is completed, the valves can be configured to allow the second dimension pump BSM to rinse the second chromatography column.

Figure 12:
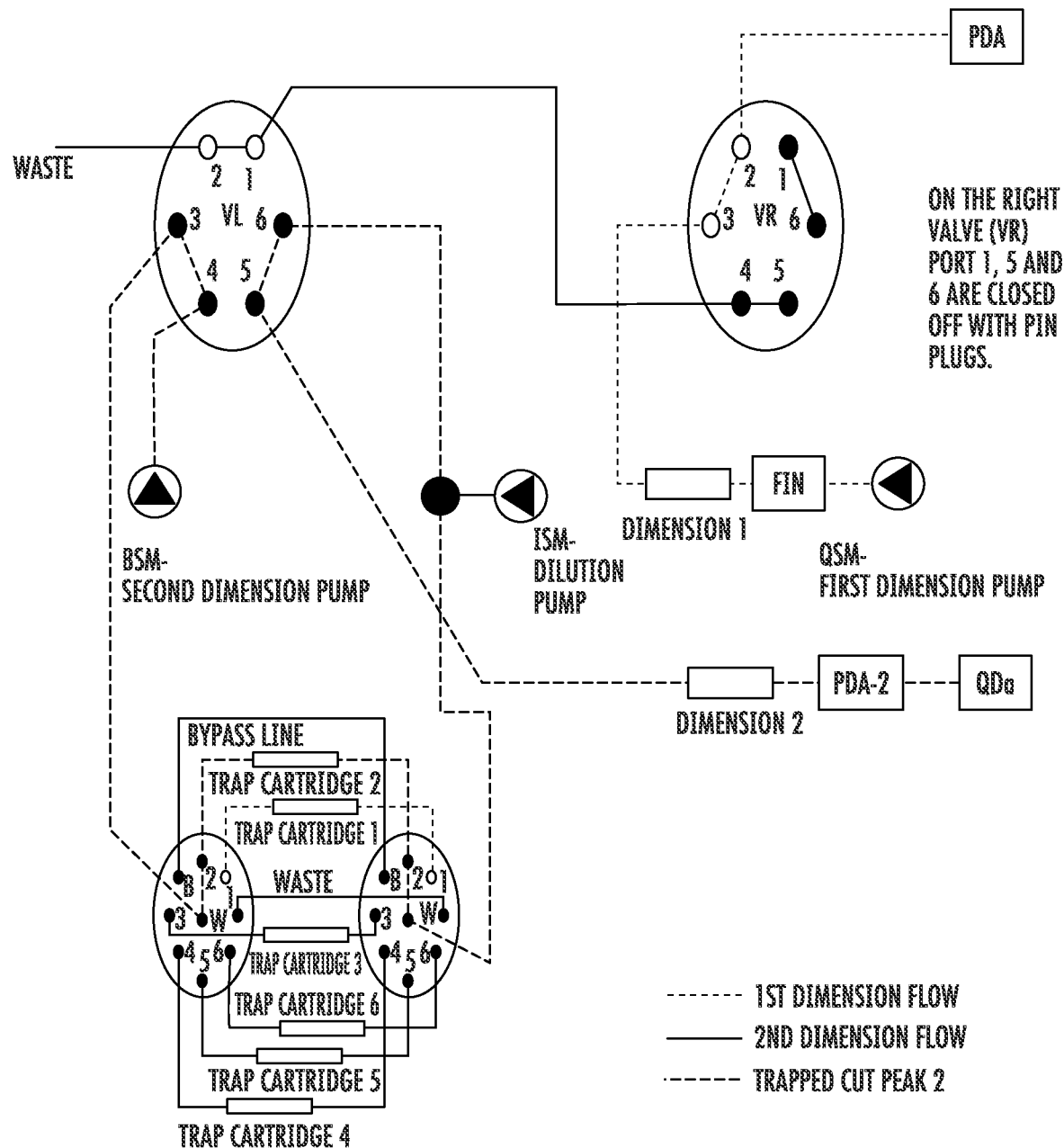
FIG. 12 is an exemplary flow diagram of the multi-dimensional system of FIG. 2 illustrating the valves configured to a fifth position.
Figure 13:
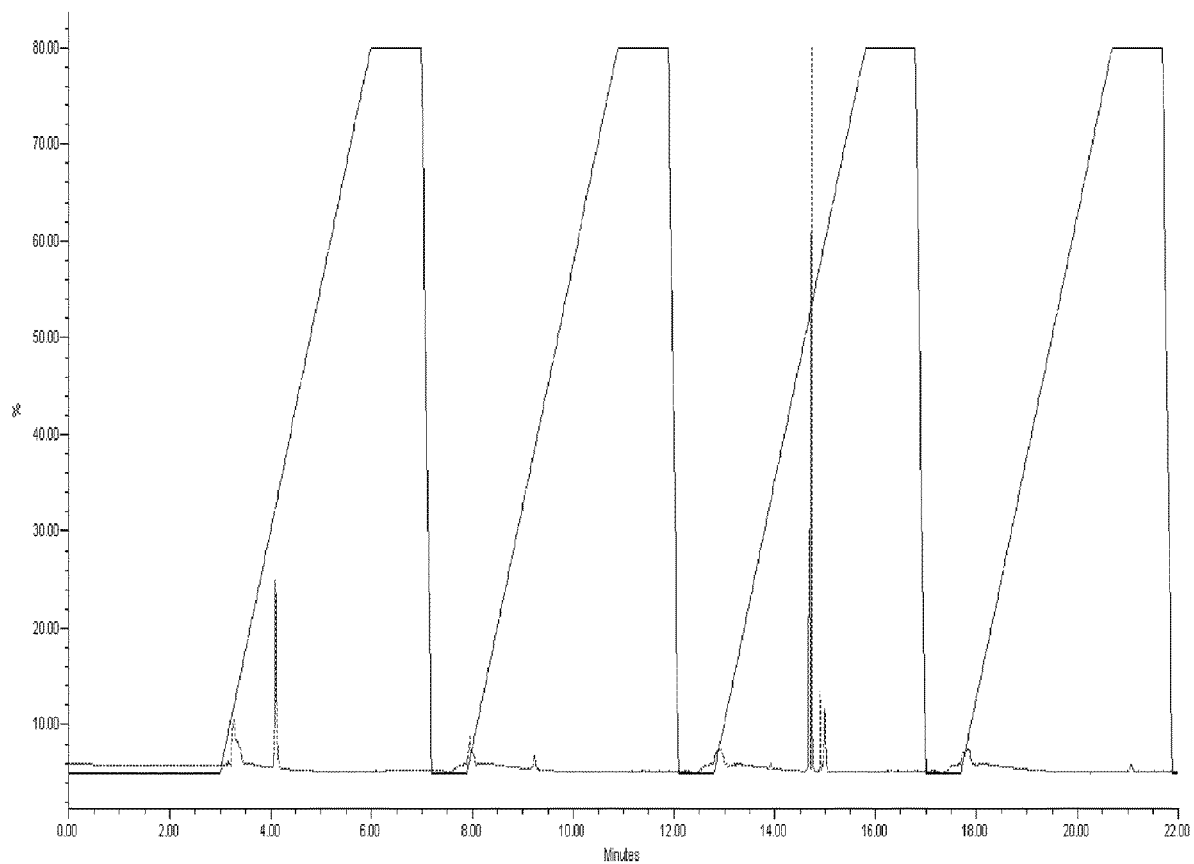
FIG. 13 is exemplary chromatogram showing the results of the second dimension analysis with a trace of the mobile phase gradient as % B.

Referring now to FIG. 12, the valves are configured to another release position which provides a flow path from the second dimension pump BSM, through the left valve VL, one of the pair of multi-port valves (bottom left multiport valve at port 2), the second trap cartridge, the other of the pair of multi-port valves (bottom right multiport valve at port 2), the left valve VL again, the second chromatography column, and the second PDA-2 detector and the QDa detector while the first dimension pump QSM is fluidly coupled to the first chromatography column, the right valve VR, and the first detector PDA. Thus, it will be appreciated that the second dimension pump BSM is thus used here to release the second cut distinct flow segment trapped in the second trap cartridge (ports 2-2 of the multiport valves are opened, allowing release of the trapped flow segment through the center port of the bottom right multiport valve), and the valves are used to guide the released flow segment through the left valve VL and to the second chromatography column for a second separation. Dilution pump ISM and mixing 'T' may similarly be used here to weaken the released flow segment from the second trap cartridge prior to it reaching the second chromatography column to improve separation functionality in the second chromatography column. This distinct fluid segment passing through the second chromatography column is observed with the second PDA-2 detector and the QDa detector. Once completed, the valves can be configured to allow the second dimension pump BSM to rinse the second chromatography column again.

The above described process is repeated, and the valves are switched to appropriate configurations (either manually or via automation), until all of the distinct flow segments trapped in the traps are released, routed to the second chromatography column, and analyzed. It will be appreciated that the systems and methodologies described herein eliminate the need for multiple runs to complete the analysis of several components within a sample, and can preserve full chromatographic resolution by allowing longer cycle times in the second dimension. It will also be appreciated that the above described systems and processes are exemplary embodiments of the inventive disclosure, and that the systems and methodologies described herein can be utilized for any number of cuts and traps, including 2, 3, 4, 5, 6, 7, 8 . . . 16, etc.

In testing the above described system, trapping and the second dimension analysis were optimized with the use of At-column Dilution. The chromatographic peaks in the second dimension were homogeneous, yielding much easier spectral interpretation.

FIGS. 13-18 depict exemplary results of certain embodiments of this disclosure as appreciated by those having ordinary skill in the art in view of this disclosure.

Figure 14:
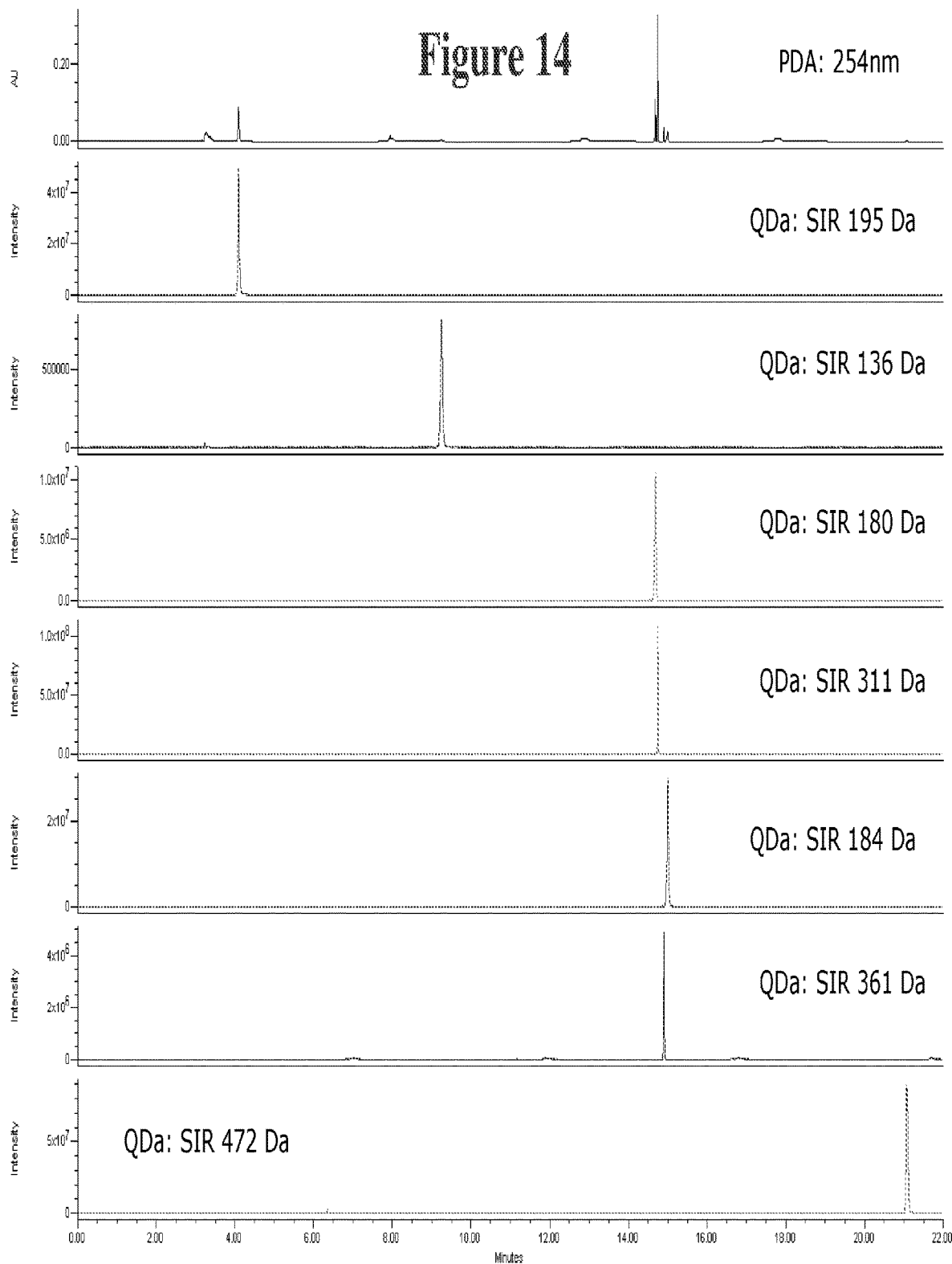
FIG. 14 is an exemplary chromatogram of a sample solution which demonstrates the identification of analytes in the second dimension.
Figure 15:
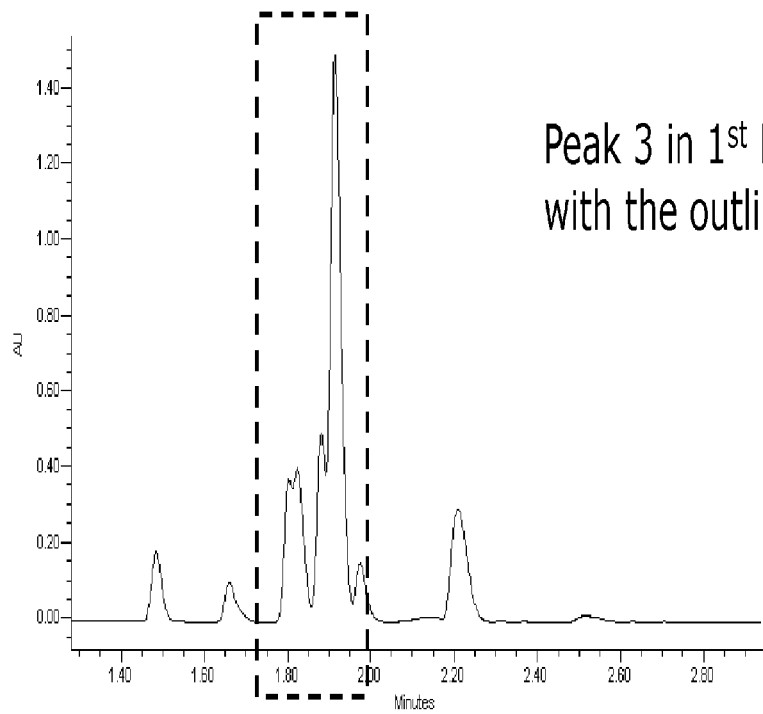
FIGS. 15 and 16 are exemplary chromatographs showing the selectivity differences between the two dimensions of the multi-dimensional system of FIG. 2.
Figure 16:
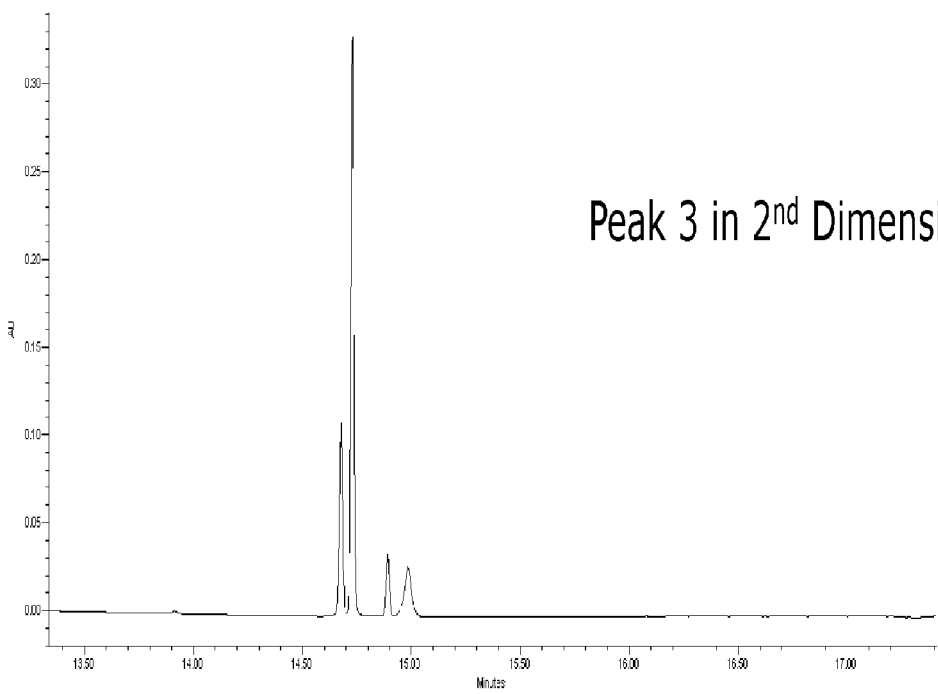

Referring specifically to FIG. 14, the analytes as selected in FIG. 5 were eluted from the high pH reversed phase column directly into the electrospray source of the QDa. Each analyte was readily identified using the SIR channels corresponding to the known components. The peaks in the final analysis are narrow and symmetrical, reflecting the useful effects of At column Dilution for re-focusing the analytes after each chromatographic step. FIG. 15 shows the selection of a region of the chromatogram at low pH. This selected segment is transferred to the second dimension for chromatography at high pH. The orthogonal second dimension provides resolution of coeluting peaks from the first dimension. The peaks are also very sharp as a result of At-column Dilution between dimensions. In addition, the elution order is significantly altered, reflecting the altered selectivity at the higher pH.

In preparation of FIGS. 1-18, the following instrumentation set up and sample protocols were used:
Columns:
  First-Dimension: BEH C18 2.1×50 mm, 1.7 um,
  Second Dimension: BEH C18 2.1×50 mm, 1.7 um,
  Trapping column: XBridge C18 Direct Connect 2.1×30 mm, Mobile Phases:
  QSM:
    Solvent A: Water
    Solvent B: Acetonitrile
    Solvent C: 1% Formic Acid in Water
  BSM:
    Solvent A: 0.1% Ammonium Hydroxide in Water
    Solvent B: 0.1% Ammonium Hydroxide in Acetonitrile
  ISM: Water
  Needle Wash: 80/20 ACN/water
  Seal wash: 10% ACN
  Injection volume: 2.0 μL
  PDA:
    Scan: 210 to 400 nm
    Channel: 254 nm
  QDa:
    Scan: 100 to 650 Da
Temperatures:
  Column 1: 40° C.
  Column 2: 40° C.
  Trap Column: Room Temperature
Samples:
  Standards
    Waters UPC2 Standard Mix:
      2 mg/ml each of 3-benzoylpyridine, Cortisone, 4-nitroaniline, 4,4'-biphenyl (in Methanol)
    Waters Analgesic Mix Standard:
      200 ug of each: Acetaminophen, Acetamidophenol, Acetanilde, Acetylsalicylic acid, Caffeine, Phenacetin, Salicylic Acid, (in Acetonitrile)
    Waters ACQUITY/Quattro micro or Quattro Premier MS Start Up Solution Kit:
      1.0 mg/mL of each: Sulfadimethoxine, Terfenadine, Reserpine, Acetaminophen, and Caffeine (in Acetonitrile)
    Final Sample Solution:
      0.45 mg/mL Sulfadimethoxine
      0.45 mg/mL Terfenadine
      0.45 mg/mL Reserpine
      0.45 mg/mL Acetaminophen
      0.45 mg/mL Caffeine
      90 ug/mL Acetamidophenol
      90 ug/mL Acetanilde
      90 ug/mL Acetylsalicylic Acid
      90 ug/mL Phenacetin
      0.20 mg/mL Salicylic Acid
      0.20 mg/mL 3-benzoylpyridine
      0.20 mg/mL Cortisone
      0.20 mg/mL 4-nitroaniline
      0.20 mg/mL 4,4'-biphenyl
Protocol:
  The sample is delivered to the first chromatographic column and eluted with the first dimension mobile phase. At the time the desired peak is to be collected, the system valves are switched in order to direct this portion of the sample from the first dimension to a sample loop or trap cartridge. While being transferred, the eluant is diluted with flow from the At-column dilution pump and the components from the first dimension segment are held in the loop or trap cartridge. The At-column dilution function ensures that the selected sample components are retained as a tight band at the entrance to the trapping cartridge. The diluent is chosen to increase retention and usually includes dilution with water, which may also adjust the pH or add ion pairing. Once the peak is collected on the loop or cartridge, the valves switch back and the first dimension separation continues. As soon as the next desired peak is reached on the first dimension, the valves are switched again in which the second sample component is collected in a different sample loop or cartridge. The process is repeated for the number of desired peaks to be collected from the sample. Once all the peaks have been collected on the loop or cartridges, the system valves are switched so that the second dimension pump delivers the desired separation gradient of increasing organic to elute the trapped analytes. As the analytes elute from the cartridge, they are diluted by the flow from the dilution pump. The diluent is a composition that ensures the components are binding as a narrow band to the head of the second chromatographic column. The gradient continues to elute the analytes from the second dimension column into the PDA and MS detectors.

Separation technology is fundamentally required to resolve all sample components to provide unequivocal identification with useful quantification in a single analytical method. All chromatographic techniques, however, reach a fundamental limit in the number of components that can be resolved in a single analysis. The above described system and methodology addresses this limitation. Additionally, traditional mobile phases for two chromatography modes are often incompatible. Transferring a peak from one chromatographic separation to another must avoid distortion of the injected peak that would compromise the separation on the second column. While this is often achieved by transferring a very small volume, the present disclosure describes a combination of trapping and At-column Dilution to transfer the peak without constraining the volume, which preserves maximum sensitivity of the analysis. In order to obtain the complete benefit of a second column, the modes of separation can be orthogonal to one another.

It is anticipated that the above described systems and methodologies can be utilized for improved isolation in purification techniques and sample preparation. The system can also be altered so that the sample is brought to another analytical technique other than a Mass Spectrometer (e.g. NMR or a Fraction Collector).

It will be appreciated that various types of components may be utilized for the above described systems and methodologies. For example, the chromatography system described herein can also include any type of chromatography technique that can be configured into a multi-dimensional chromatography system, such as normal phase chromatography, reversed phase chromatography, carbon dioxide based chromatography, size exclusion chromatography, ion exchange chromatography, hydrophilic interaction liquid interaction chromatography, hydrophobic interaction chromatography, affinity chromatography, and combinations thereof. The chromatography system can also include various combinations of techniques, such as reversed phase-reversed phase chromatography, normal phase-reversed phase chromatography, reversed phase-carbon dioxide based chromatography, normal phase-carbon dioxide based chromatography, ion exchange-reversed phase chromatography, ion exchange-size exclusion chromatography, affinity chromatography-ion exchange, affinity chromatography-size exclusion, affinity chromatography-reversed phase chromatography. These combination techniques can be combined in any order.

The fluid pumps of the chromatography system described herein can include any pump capable of generating a fluid flow (e.g., flow stream) through the multi-dimensional chromatography system. Each fluid flow can independently have a flow rate of about 0.01 uL/min, 0.1 uL/min, 1 uL/min, 0.01 mL/min, 0.1 mL/min, 1 mL/min, 10 ml/min, 100 mL/min or about 300 mL/min, depending on the chromatography techniques involved, the diameter of the tubing, valve orifices, column diameters, detector cells, etc. These values can also be used to define a range, such as about 0.01 to about 10 mL/min, or about 0.1 to about 2 mL/min.

Each fluid flow can independently contain various amount of organic, aqueous and compressible fluid (e.g., carbon dioxide) content. A fluid flow can contain about 0, 5, 10, 15, 20, 25, 30, 35, 40, 45, 50, 55, 60, 65, 70, 75, 80, 85, 90, 95 or about 100% organic content. These values can be used to define a range, such as about 70% to about 90%. A fluid flow can also contain about 0, 5, 10, 15, 20, 25, 30, 35, 40, 45, 50, 55, 60, 65, 70, 75, 80, 85, 90, 95 or about 100% aqueous content. These values can be used to define a range, such as about 20% to about 40%. A fluid flow can contain about 0, 5, 10, 15, 20, 25, 30, 35, 40, 45, 50, 55, 60, 65, 70, 75, 80, 85, 90, 95 or about 100% compressible fluid (e.g., carbon dioxide) content. In one embodiment, a fluid flow containing carbon dioxide, e.g., a carbon dioxide based chromatography technique, can contain a co-solvent or modifier. The amount of co-solvent or modifier in the carbon dioxide mobile phase can vary depending on whether it is organic or aqueous, as provided above. The co-solvent or modifier can be methanol. In one embodiment, one of the fluid flows can be 95% carbon dioxide containing 5% methanol.

Each fluid flow can independently have various pH values. A fluid flow can have a pH value of about 2, 2.5, 3, 3.5, 4, 4.5, 5, 5.5, 6, 6.5, 7, 7.5, 8, 8.5, 9, 9.5, 10, 10.5, 11, 11.5, 12, 12.5 and about 13. These values can be used to define a range, such as about 6 to about 8, or about 3 to about 5. Each fluid flow can independently contain various ionic strength values of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.0.09, 0.0.1, 0.2, 0.3, 0.4, 0.5, 0.6, 0.7, 0.8, 0.9, 1, 2, 3, 4 or about 5 M. These values can be used to define a range, such as about 0.01 to about 0.5 M. One or more of the fluid flows in the systems or methodologies of the present disclosure can be a strong mobile phase with respect to one of the chromatography techniques. A strong mobile phase is one that has a high elution strength and results in little or no retention of a component on a chromatography column, or sorbent. A sample or component dissolved in a strong mobile phase will have a greater affinity for the mobile phase than the stationary phase. One or more of the fluid flows can be a weak mobile phase with respect to one of the chromatography techniques. A weak mobile phase is one that has a low elution strength and results in high retention of a component on a chromatography column, or sorbent. A sample or component dissolved in a weak mobile phase will have a lesser affinity for the mobile phase than the stationary phase.

As described herein, the chromatography system can include one or more chromatography columns, e.g., a first chromatography column, a second chromatography column, etc. The columns can be any column used to separate one or more analytes using one or more of the chromatography techniques in a multi-dimensional chromatography system. The columns can include preparative columns, analytical columns and capillary columns.

The valves of the chromatography system can be any valve used with one or more of the chromatography techniques and capable for diverting at least one flow to at least two different flow paths. The valves can have multiple ports and conduits, and be capable of diverting at least two flows to at least two different flow paths wherein each can be diverted simultaneously. The valves can also be capable of diverting at least three flows to at least two different flow paths wherein each can be diverted simultaneously (e.g., a 4 port valve, a 6 port valve, a 8 port valve, a 10 port valve).

The detectors of the chromatography system can be any detector used with one or more of the chromatography techniques. The detector can be a UV detector, a photo diode array detector, a mass spectrometer, a NMR detector, a fluorescence detector, an evaporative light scattering detector, a charged aerosol detector, a conductivity detector, an electrochemical detector or combinations thereof. In some embodiments, the present disclosure can incorporate traditionally non-compatible detectors to the analysis of a sample by use of selectable At-Column Dilution, such as by eliminating ion pairing reagents or adjusting pH for best or consistent detection. The chromatography systems and methods of the present disclosure can be used to transfer and interface with other analytical techniques, such as a fraction collector.

Some current chromatographic methods are not suitable for mass detection. These methods can be performed using the multi-dimensional system of the present disclosure which can modify the method conditions to be compatible with a mass detector. For example, the current method can be run on a first dimension in which a target peak is transferred to a second dimension. In the second dimension, the isolated peak can be trapped on a reversed-phase cartridge. After washing away the unretained salt and buffer, the isolated peak can be washed onto a second reversed-phase column using a volatile mobile phase, e.g., water-acetonitrile-formic acid. A gradient of these solvents can be used to elute from the second reversed-phase column into the source of the mass spectrometer. In the second dimension, the method conditions can be changed in order to separate the target peak into individual components and at the same time obtaining conditions that are suitable for mass detection of the component(s) within the peak. Alternatively, the change in the second dimension can be a change in column chemistry, mobile phase, or combinations thereof.

The At-Column Dilution mixer (e.g., ACD "T") of the chromatography system can include at least one capable of mixing two fluid flows together to form a combined fluid flow. The injector can be a fitting as described in U.S. Pat. Nos. 6,790,361; 7,875,175 and 7,909,994, the contents of each are incorporated herein by reference in their entireties. The mixer can be a standard liquid chromatography tee, Y, inverted Y, or inverted Y union. The mixer can also be a small packed-bed mixer such as those used for solvent blending (e.g., Waters P/N 700002911).

The At-Column Dilution mixer can combine at least two flow streams, e.g., the first and second flow streams, having at least one physical or chemical difference between them to form a combined flow stream, e.g. a third flow stream. The mixer can combine the flow streams in any ratio from 0:1 to 1:0 to obtain a combined flow stream. The at least two flow streams can have a physical or chemical difference between them including the ratio of organic/aqueous or carbon dioxide/organic/aqueous content, pH values, ionic strength values, or combinations thereof. The combined flow stream can be isocratic or can be a gradient with respect to one or more characteristics.

The system and method of the present disclosure can improve the interface and transfer between at least two dimensions in a multi-dimension chromatography system by controlling or selectively combining at least two fluid flows (e.g., with the dilution pump) to form a combined flow having certain chemical or physical properties. In one embodiment, the two fluid flows (e.g., a first and a second fluid stream) can be combined into a combined flow (e.g., a third fluid stream) wherein the combined flow stream has about 80%, 75, 70, 65, 60, 55, 50, 45, 40, 35, 30, 25, 20, 15, 10 or about 5%, or less (or more), by volume, of organic content or composition than one of the first flow streams. These values can also be used to define ranges, such as about 50% to about 20%. In particular, the two fluid flows can be combined into a combined flow wherein the combined flow has about 50% or less, by volume, of organic content or composition than the first flow stream. In some embodiments, the combined flow can have more, by volume, organic content. In other embodiments, the two fluid streams can be combined into a combined fluid stream wherein the combined flow stream has a pH value about or at least about, 0.5, 1, 1.5, 2, 2.5 or about 3 pH units different (e.g., less or greater) than one of the first flow streams. In particular, the two fluid flows can be combined into a combined flow wherein the combined flow has a pH value about or at least about 1 pH unit different than the first flow stream.

In yet other embodiments, the two fluid streams can be combined into a combined fluid stream wherein the combined flow stream has about 80%, 75, 70, 65, 60, 55, 50, 45, 40, 35, 30, 25, 20, 15, 10 or about 5%, or less (or more) ionic strength than one of the first flow streams. These values can also be used to define ranges, such as about 60% to about 30%. In particular, the two fluid flows can be combined into a combined flow wherein the combined flow has about 50% or less ionic strength than the first flow stream. In some embodiments, the combined flow can have more or a higher ionic strength.

The traps of the present system can include, for example, a loop, a chromatography column, a cartridge, etc) to isolate one or more of the components diverted from a first dimension separation. The trap(s) can have a high affinity for one or more of the components diverted from a first dimension separation. In one embodiment, the trap is capable of physically or chemically retaining an analyte in the third flow stream. The trap can be a trap column or cartridge containing a chromatographic media used for reversed phase, normal phase, affinity chromatography-ion exchange, affinity chromatography-size exclusion, affinity chromatography-reversed-phase, or combinations thereof. The traps can include one or more trap cartridges having absorbent material, but can additionally or alternatively include one or more traps consisting of or comprising an empty tube. One or more of the traps can contain a solid absorbent or an empty tube that would hold the fluid segment from the first dimension in solution waiting for analysis in the second dimension.

The systems and methods of the present disclosure can increase the retention of at least one diverted component (or analyte) on the trap (or other device) or additional chromatography column, e.g., the second chromatography column. The retention of at least one the diverted component can be increased by about 5%, 10, 15, 20, 25, 30, 35, 40, 45, 50, 55, 60, 65, 70, 75, 80, 85, 90, 95 or about 100% as compared to a system or method without At-Column Dilution. These values can be used to define a range, such as about 50% to about 90%.

The separation performance on the second chromatography column can be improved by the system and method of the present disclosure. For example, the inclusion of the At-Column Dilution feature (e.g., the ISM Dilution Pump) can increase the sensitivity, e.g., signal-to-noise ratio, of the one or more detectors downstream of the second chromatography column by about 10%, 20, 30, 40, 50, 60, 70, 80, 90 or about 95% or more compared to a system or method without At-Column Dilution as described herein. The inclusion of the At-Column Dilution feature can also improve peak shape of components separated on the second chromatography column by about 10%, 20, 30, 40, 50, 60, 70, 80, 90 or about 95% or more compared to a system or method without At-Column Dilution as described herein.

While the subject inventive disclosure has been shown and described with reference to preferred embodiments, those skilled in the art will readily appreciate that various changes and/or modifications may be made thereto without departing from the spirit and scope of the subject invention as defined by the appended claims.

The invention claimed is:

1. A chromatography system, comprising:
   a first chromatography column for receiving and separating a flow stream;
   a plurality of traps configured to trap a plurality of distinct flow segments exiting the first chromatography column during separation of the flow stream;
   a second chromatography column operatively associated with the plurality of traps for receiving and separating the plurality of distinct flow segments; and
   a plurality of pumps, wherein at least one of the plurality of pumps is configured to: dilute at least one of the plurality of distinct flow segments as the plurality of distinct flow segments flow from the plurality of traps to the second chromatography column along a flow path extending from the plurality of traps to the secondary chromatography column that is free of trapping columns and traps.

2. A chromatography system according to claim 1, wherein each of the traps is a trap cartridge, holding loop or bypass tube.

3. A chromatography system according to claim 1, further comprising:
   at least one valve configured to selectively fluidly couple, to the first and second chromatography columns, and to the plurality of traps.

4. A chromatography system according to claim 3, wherein the at least one valve is configurable to a first position defining a first flow path which fluidly couples the first chromatography column to a detector, and fluidly isolates the first chromatography column from the plurality of traps, and a second position defining a second flow path which fluidly couples the first chromatography column with a first of the plurality of traps for trapping a first of the plurality of distinct flow segments, and fluidly isolates the first chromatography column from all but the first of the plurality of traps.

5. A chromatography system according to claim 4, wherein the at least one valve is configurable to a third position defining a third flow path which fluidly couples the first chromatography column with a second of the plurality of traps for trapping a second of the plurality of distinct flow segments, and fluidly isolates the first chromatography column from all but the second of the plurality of traps.

6. A chromatography system according to claim 5, wherein the at least one valve is configurable to a fourth position defining a fourth flow path which fluidly couples the first trap and the second chromatography column to direct the first distinct flow segment from the first trap to the second chromatography column.

7. A chromatography system according to claim 6, wherein the at least one valve is configurable to a fifth position defining a fifth flow path which fluidly couples the second trap with the second chromatography column to direct the second distinct flow segment to the second chromatography column.

8. A chromatography system according to claim 7, the plurality of pumps pump a plurality of flow streams through the chromatography system, the plurality of pumps including a first pump in fluid communication with an inlet of the first chromatography column, and a second pump operatively associated with the second chromatography column and the plurality of traps.

9. A chromatography system according to claim 8, wherein the at least one valve is configurable to a rinse position defining a sixth flow path which fluidly couples the second pump with the second chromatography column for rinsing the second chromatography column, and fluidly isolates the second pump from the plurality of traps.

10. A chromatography system according to claim 8, wherein the at least one valve is configurable to a first release position which fluidly couples the second pump, the first trap, and the second chromatography column for releasing the first distinct flow segment from the first trap to the second chromatography column and fluidly isolates the second pump from all but the first of the plurality of traps.

11. A chromatography system according to claim 10, wherein the at least one valve is configurable to a second release position which fluidly couples the second pump, the second trap, and the second chromatography column for releasing the second distinct flow segment from the second trap to the second chromatography column, and fluidly isolates the second pump from all but the second of the plurality of traps.

12. A chromatography system according to claim 10, wherein in the second position of the at least one valve, a dilution pump is included in the plurality of pumps and is in fluid communication with the second flow path and configured to dilute the first distinct flow segment as the first distinct flow segment flows from the first chromatography column to the first trap.

13. A chromatography system according to claim 12, wherein the at least one valve is configured to selectively fluidly couple the dilution pump to the released first distinct flow segment between the first trap and the second chromatography column, and to selectively fluidly couple the dilution pump to the released second distinct flow segment between the second trap and the second chromatography column, such that the released first and second flow segments are diluted prior to reaching the second chromatography column.

14. A chromatography method, comprising:
    directing a fluid sample through a first chromatographic column configured to receive and separate the fluid sample;
    guiding a plurality of distinct flow segments exiting the first chromatographic column during separation of the fluid sample in the first chromatographic column to a corresponding plurality of traps;
    trapping the plurality of distinct flow segments in the plurality of traps;
    releasing the trapped plurality of distinct flow segments from the plurality of traps;
    directing the released plurality of distinct flow segments through a second chromatographic column configured to receive and separate the released plurality of distinct flow segments;
    diluting at least one of the plurality of distinct flow segments via a pump configured to dilute the at least one of the plurality of distinct flow segments as the plurality of distinct flow segments flow from the plurality of traps to the second chromatographic column along a flow path extending from the plurality of traps to the secondary chromatography column that is free of trapping columns and traps.

15. A chromatography method according to claim 14, wherein the plurality of traps are operatively disposed between a pair of multiport valves.

16. A chromatography method according to claim 14, wherein the distinct flow segments of the separated fluid sample are fluidly coupled to the corresponding plurality of traps during different time segments.

17. A chromatography method according to claim 16, wherein the plurality of distinct flow segments of the separated fluid sample are trapped in the corresponding plurality of traps during a single loading of the fluid sample through the first chromatographic column.

18. A chromatography method according to claim 16, wherein the plurality of distinct flow segments of the separated fluid sample are released from the plurality of traps and directed through the second chromatographic column in sequence.

19. A chromatography method according to claim 14, further comprising diluting each of the distinct flow segments prior to trapping the plurality of distinct flow segments in the plurality of traps.

20. A chromatography method according to claim 14, wherein each of the traps is a trap cartridge, holding loop or bypass tube.

* * * * *